US012636822B2

(12) United States Patent
Hotta et al.

(10) Patent No.: US 12,636,822 B2
(45) Date of Patent: May 26, 2026

(54) INJECTION MOLDING MACHINE

(71) Applicant: SUMITOMO HEAVY INDUSTRIES, LTD., Tokyo (JP)

(72) Inventors: Daigo Hotta, Chiba (JP); Yuta Hirotomi, Chiba (JP); Yuta Sato, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 86 days.

(21) Appl. No.: 18/434,685

(22) Filed: Feb. 6, 2024

(65) Prior Publication Data

US 2024/0308122 A1      Sep. 19, 2024

(30) Foreign Application Priority Data

Mar. 17, 2023    (JP) .................................. 2023-043348

(51) Int. Cl.
*B29C 45/77* (2006.01)
*B29C 45/76* (2006.01)

(52) U.S. Cl.
CPC .............. *B29C 45/77* (2013.01); *B29C 45/76* (2013.01); *B29C 45/762* (2013.01); *B29C 45/7653* (2013.01); *B29C 45/766* (2013.01); *B29C 2045/7606* (2013.01); *B29C 2945/76006* (2013.01); *B29C 2945/7604* (2013.01); *B29C 2945/76187* (2013.01); *B29C 2945/76381* (2013.01); *B29C 2945/76387* (2013.01);
(Continued)

(58) Field of Classification Search
CPC .................. B29C 45/77; B29C 45/766; B29C 2045/7606; B29C 2945/76966
See application file for complete search history.

(56) References Cited

U.S. PATENT DOCUMENTS 5,182,716 A      1/1993   Vorgitch et al.
5,997,778 A      12/1999  Bulgrin
(Continued)

FOREIGN PATENT DOCUMENTS

CN          104908272 A  *  9/2015  ........... B29C 45/661
CN          117341164 A  *  1/2024  ............. B29C 45/77
(Continued)

OTHER PUBLICATIONS

Machine Translation of KR 10-0661219 B1, Dec. 22, 2006 (Year: 2006).*
(Continued)

*Primary Examiner* — Benjamin A Schiffman
(74) *Attorney, Agent, or Firm* — WTA IP Law P.C.

(57) ABSTRACT

An injection molding machine includes a storage unit in which input information input via an operation unit and a molding condition under which molding is performed using a gain specified by the input information are stored in association with each other, and a control unit configured to generate a signal with a feedback-control, which uses a difference between a set value used to control an object to be controlled and an actual value measured from the object to be controlled and the gain specified by the input information associated with the molding condition, and to control a drive source using the signal to perform the molding, in a case where the molding indicated by the molding condition is performed.

5 Claims, 9 Drawing Sheets

(52) U.S. Cl.
CPC .............. *B29C 2945/76498* (2013.01); *B29C 2945/76595* (2013.01); *B29C 2945/76859* (2013.01); *B29C 2945/76949* (2013.01); *B29C 2945/76966* (2013.01); *B29C 2945/76969* (2013.01)

(56) References Cited

U.S. PATENT DOCUMENTS

| | | | | |
|---|---|---|---|---|
| 6,289,259 B1 * | 9/2001 | Choi | ................... | B23K 3/0623 |
| | | | | 425/149 |
| 8,501,059 B2 * | 8/2013 | Schultz | ................... | B29C 45/77 |
| | | | | 425/149 |
| 9,090,015 B2 * | 7/2015 | Oono | ...................... | B29C 45/77 |
| 10,245,771 B2 * | 4/2019 | Schiffers | ............. | B29C 45/7613 |
| 10,343,319 B2 * | 7/2019 | Yamamoto | ............. | B29C 45/64 |
| 11,407,158 B2 * | 8/2022 | Altonen | ................... | B29C 45/78 |
| 11,992,987 B2 * | 5/2024 | Arita | ................... | B29C 45/0084 |
| 2001/0026031 A1 * | 10/2001 | Onishi | ................... | B29C 45/77 |
| | | | | 425/149 |
| 2004/0159965 A1 * | 8/2004 | Oka | ........................ | B29C 45/77 |
| | | | | 264/40.1 |
| 2024/0198566 A1 * | 6/2024 | Hotta | ...................... | B29C 45/77 |
| 2024/0300154 A1 * | 9/2024 | Hirotomi | ............. | B29C 45/762 |
| 2024/0416569 A1 * | 12/2024 | Matsunaga | ............. | B29C 45/84 |
| 2025/0058508 A1 * | 2/2025 | Matsui | ............... | B29C 45/7653 |

FOREIGN PATENT DOCUMENTS

| | | | | |
|---|---|---|---|---|
| DE | 691 13 128 T2 | 5/1996 | | |
| DE | 102018108106 A1 * | 10/2019 | ......... | G05D 23/1919 |
| DE | 102023125119 A1 * | 3/2024 | ............. | B29C 45/84 |
| DE | 102023134310 A1 * | 6/2024 | ............. | B29C 45/77 |
| EP | 3202549 A1 * | 8/2017 | ............. | B29C 45/03 |
| JP | 2007-130978 A | 5/2007 | | |
| JP | 2011-115967 A | 6/2011 | | |
| JP | 2017170856 A * | 9/2017 | ............. | B29C 45/76 |
| KR | 100661219 B1 * | 12/2006 | ............. | B29C 45/77 |
| KR | 20170042473 A * | 4/2017 | ............. | B29C 45/18 |

OTHER PUBLICATIONS

Office Action of the corresponding DE 102024106863.9 mailed on May 19, 2025.

* cited by examiner

FIG. 5

| ITEM | SETTING NAME | PROPORTIONAL GAIN | INTEGRAL GAIN |
|---|---|---|---|
| SPEED SENSITIVITY | SHARP | N11 | N21 |
| | STANDARD | N12 | N22 |
| | SOFT | N13 | N23 |
| FILLING PRESSURE SENSITIVITY | SHARP | N14 | N24 |
| | STANDARD | N15 | N25 |
| | SOFT | N16 | N26 |
| . . . | . . . | . . . | . . . |

FIG. 6

| MOLDING CONDITION NAME | PRODUCT NAME | MOLD NAME | MOLDING MATERIAL NAME | SETTING OF FILLING PRESSURE SENSITIVITY | SETTING OF HOLDING PRESSURE SENSITIVITY | SETTING OF BACK PRESSURE SENSITIVITY | SETTING OF SPEED SENSITIVITY |
|---|---|---|---|---|---|---|---|
| ×× | ○× | △△ | POLYPROPYLENE | STANDARD | STANDARD | STANDARD | SHARP |
| ⋮ | ⋮ | ⋮ | ⋮ | ⋮ | ⋮ | ⋮ | ⋮ |

Figure 7:
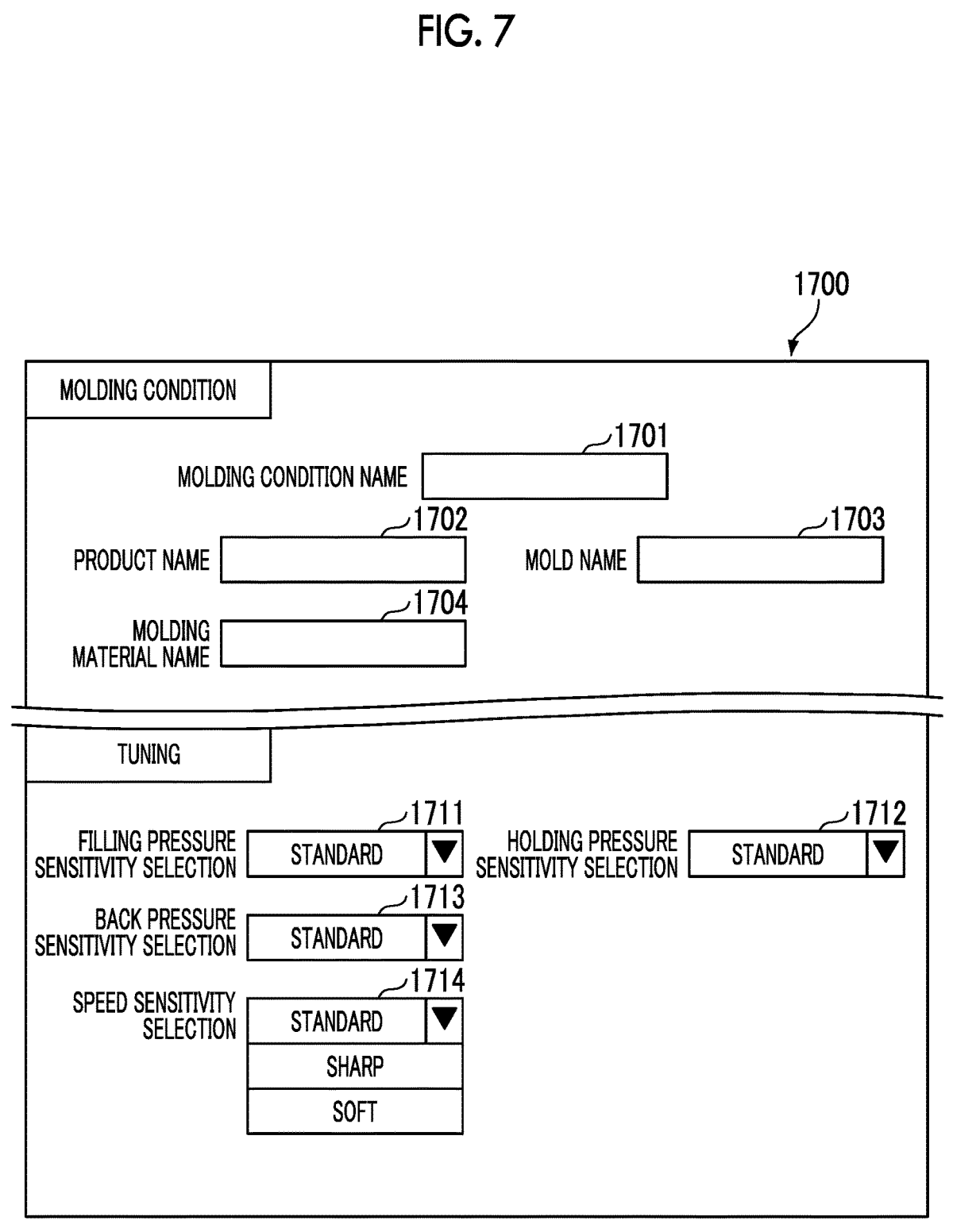

MOLDING CONDITION

MOLDING CONDITION NAME ⟋1701

PRODUCT NAME ⟋1702   MOLD NAME ⟋1703

MOLDING MATERIAL NAME ⟋1704

TUNING

FILLING PRESSURE SENSITIVITY SELECTION ⟋1711 | STANDARD ▼   HOLDING PRESSURE SENSITIVITY SELECTION ⟋1712 | STANDARD ▼

BACK PRESSURE SENSITIVITY SELECTION ⟋1713 | STANDARD ▼

SPEED SENSITIVITY SELECTION ⟋1714 | STANDARD ▼

SHARP

SOFT

FIG. 8

INJECTION MOLDING MACHINE

CROSS-REFERENCE TO RELATED APPLICATIONS

This application claims priority to Japanese Patent Application No. 2023-043348, filed on Mar. 17, 2023, which is incorporated by reference herein in its entirety.

BACKGROUND

Technical Field

Certain embodiments of the present invention relate to an injection molding machine and a display unit of the injection molding machine.

Description of Related Art

A molding method including melting a solid molding material and injecting the melted molding material into a mold is widely used as a technique for molding a molding product. Among molding machines, a so-called injection molding machine that melts a molding material and injects the melted molding material into a mold to perform molding is widely used. A technique for obtaining an optimal value of a control gain is proposed to ensure the quality of a molding product in an injection molding machine (for example, the related art).

SUMMARY

An injection molding machine according to an aspect of the present invention includes: a storage unit in which input information input via an operation unit and a molding condition under which molding is performed using a gain specified by the input information are stored in association with each other; and a control unit configured to generate a signal with a feedback-control, which uses a difference between a set value used to control an object to be controlled and an actual value measured from the object to be controlled and the gain specified by the input information associated with the molding condition, and to control a drive source using the signal to perform the molding, in a case where the molding indicated by the molding condition is performed.

BRIEF DESCRIPTION OF THE DRAWINGS

FIG. 5 is a diagram showing a table structure of a correspondence information storage section according to the other embodiment.

FIG. 6 is a diagram showing a table structure of a setting storage section according to the other embodiment.

FIG. 7 is a diagram illustrating a setting screen that is displayed by a display control unit according to the other embodiment.

FIG. 8 is a diagram illustrating a configuration of an injection control unit according to the other embodiment.

DETAILED DESCRIPTION

Figure 1:
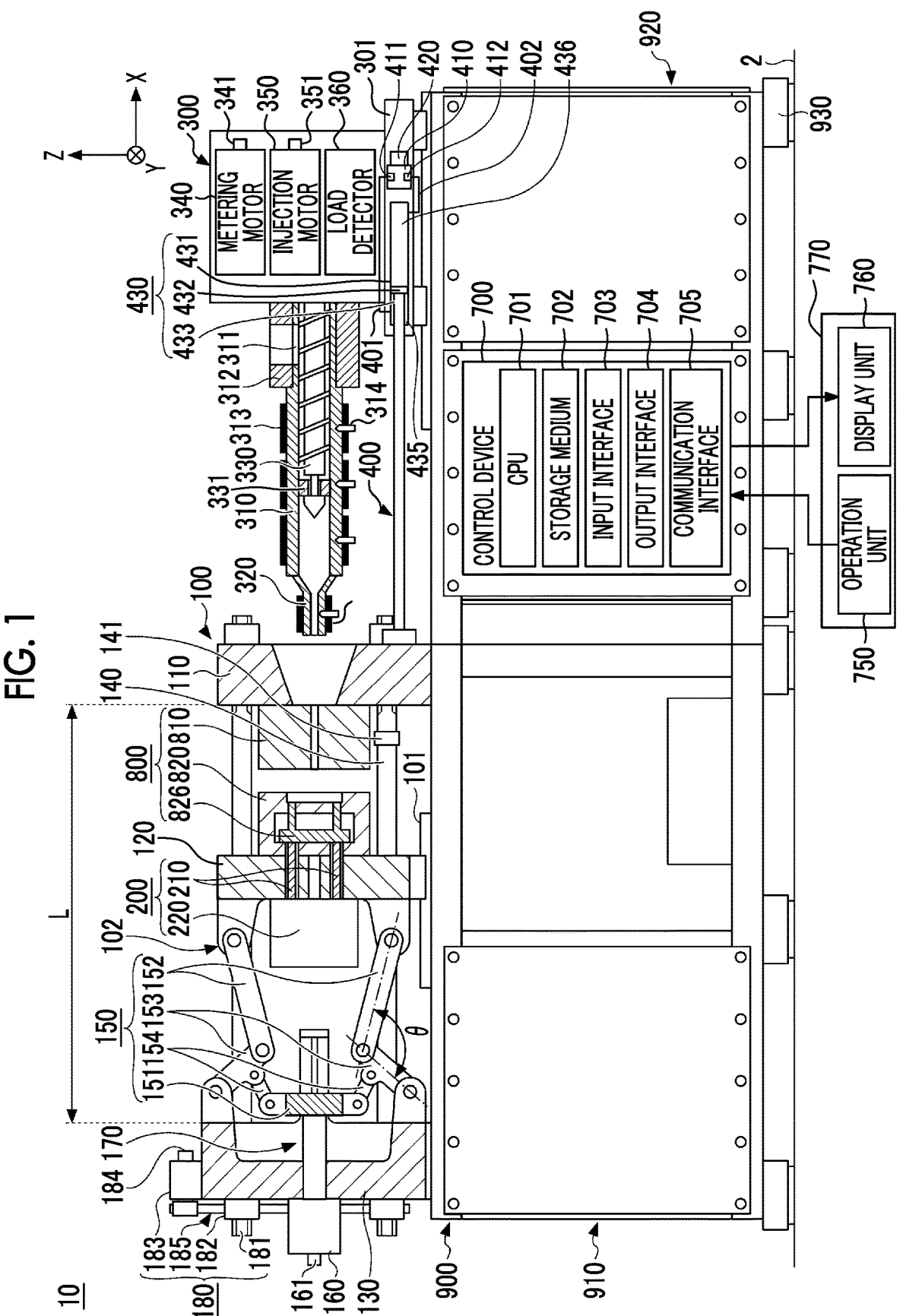
FIG. 1 is a diagram showing a state of an injection molding machine according to an embodiment at a time of completion of mold opening.

However, in the related art, a gain of a controller for controlling an output of an injection motor is changed on the basis of a load state of a molten resin but a processing burden on the controller may be increased.

It is desirable to provide a technique that reduces a processing burden and improves the quality of a molding product by allowing a gain, which corresponds to a molding condition required to mold the molding product, to be settable.

Embodiments of the present invention will be described below with reference to the drawings. Further, the embodiments to be described below do not limit the present invention, and are merely illustrative. Not all features and combinations thereof described in the embodiments are necessarily essential to the present invention. The same or corresponding components will be denoted in the respective drawings by the same or corresponding reference numerals, and the description thereof will be omitted.

Figure 2:
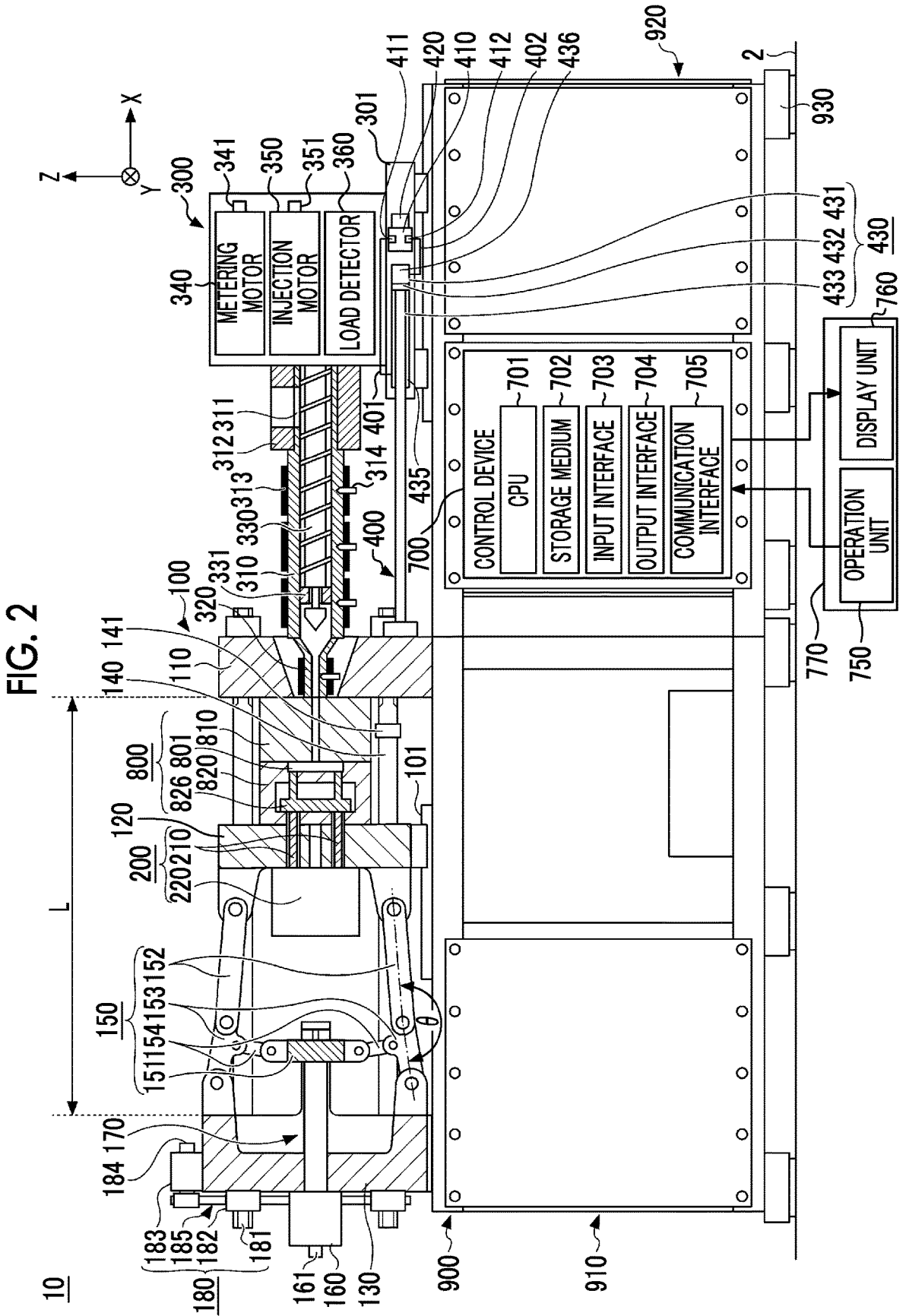
FIG. 2 is a diagram showing a state of the injection molding machine according to the embodiment at a time of mold clamping.

FIG. 1 is a diagram showing a state of an injection molding machine according to an embodiment at a time of completion of mold opening. FIG. 2 is a diagram showing a state of the injection molding machine according to the embodiment at a time of mold clamping. In this specification, an X-axis direction, a Y-axis direction, and a Z-axis direction are directions perpendicular to each other. The X-axis direction and the Y-axis direction indicate horizontal directions, and the Z-axis direction indicates a vertical direction. In a case where a mold clamping unit 100 is of a horizontal type, the X-axis direction is a mold opening/closing direction and the Y-axis direction is a width direction of an injection molding machine 10. A negative side in the Y-axis direction is referred to as an operation side, and a positive side in the Y-axis direction is referred to as a counter-operation side.

As shown in FIGS. 1 and 2, the injection molding machine 10 includes a mold clamping unit 100 that opens and closes a mold unit 800, an ejector unit 200 that ejects molding products molded by the mold unit 800, an injection unit 300 that injects a molding material into the mold unit 800, a moving unit 400 that causes the injection unit 300 to advance and retreat with respect to the mold unit 800, a control device 700 that controls the respective components of the injection molding machine 10, and a frame 900 that supports the respective components of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are installed on a floor 2 via leveling adjusters 930, respectively. The control device 700 is disposed in an internal space of the injection unit frame 920. The respective components of the injection molding machine 10 will be described below.

Mold Clamping Unit

In the description of the mold clamping unit 100, a moving direction of a movable platen 120 in a case where a mold is to be closed (for example, an X-axis positive direction) will correspond to a front, and a moving direction of the movable platen 120 in a case where the mold is to be opened (for example, an X-axis negative direction) will correspond to a rear.

The mold clamping unit 100 performs mold closing, pressurization, mold clamping, depressurization, and mold opening of the mold unit 800. The mold unit 800 includes a stationary mold 810 and a movable mold 820. The mold clamping unit 100 is of, for example, a horizontal type, and the mold opening/closing direction of the mold clamping unit 100 is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 with respect to the stationary platen 110 in the mold opening/closing direction.

The stationary platen 110 is fixed to the mold clamping unit frame 910. The stationary mold 810 is attached to a surface of the stationary platen 110 facing the movable platen 120.

The movable platen 120 is disposed to be movable with respect to the mold clamping unit frame 910 in the mold opening/closing direction. Guides 101 that guide the movable platen 120 are laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 to perform mold closing, pressurization, mold clamping, depressurization, and mold opening of the mold unit 800. The moving mechanism 102 includes a toggle support 130 that is disposed with an interval between the stationary platen 110 and itself, tie bars 140 that connect the stationary platen 110 to the toggle support 130, a toggle mechanism 150 that moves the movable platen 120 with respect to the toggle support 130 in the mold opening/closing direction, a mold clamping motor 160 that operates the toggle mechanism 150, a motion conversion mechanism 170 that converts a rotary motion of the mold clamping motor 160 into a linear motion, and a mold space adjustment mechanism 180 that adjusts an interval between the stationary platen 110 and the toggle support 130.

The toggle support 130 is disposed with an interval between the stationary platen 110 and itself, and is placed on the mold clamping unit frame 910 to be movable in the mold opening/closing direction. The toggle support 130 may be disposed to be movable along guides laid on the mold clamping unit frame 910. The guides for the toggle support 130 may be common to the guides 101 for the movable platen 120.

In the present embodiment, the stationary platen 110 is fixed to the mold clamping unit frame 910, and the toggle support 130 is disposed to be movable with respect to the mold clamping unit frame 910 in the mold opening/closing direction. However, the toggle support 130 may be fixed to the mold clamping unit frame 910, and the stationary platen 110 may be disposed to be movable with respect to the mold clamping unit frame 910 in the mold opening/closing direction.

The tie bars 140 connect the stationary platen 110 to the toggle support 130 with an interval L between the stationary platen 110 and the toggle support 130 in the mold opening/closing direction. A plurality of (for example, four) tie bars 140 may be used. The plurality of tie bars 140 are disposed parallel to the mold opening/closing direction and extend depending on a mold clamping force. At least one tie bar 140 may be provided with a tie bar strain detector 141 that measures a strain of the tie bar 140. The tie bar strain detector 141 sends a signal indicating a detection result thereof to the control device 700. The detection result of the tie bar strain detector 141 is used for the measurement of a mold clamping force, and the like.

The tie bar strain detector 141 is used in the present embodiment as a mold clamping force detector for measuring a mold clamping force, but the present invention is not limited thereto. The mold clamping force detector is not limited to a strain gauge type and may be of a piezoelectric type, a capacitive type, a hydraulic type, an electromagnetic type, or the like. A position where the mold clamping force detector is attached is also not limited to the tie bar 140.

The toggle mechanism 150 is disposed between the movable platen 120 and the toggle support 130, and moves the movable platen 120 with respect to the toggle support 130 in the mold opening/closing direction. The toggle mechanism 150 includes a crosshead 151 that moves in the mold opening/closing direction and a pair of link groups that is bent and stretched depending on the movement of the crosshead 151. Each of the pair of link groups includes first and second links 152 and 153 that are bendably and stretchably connected to each other by a pin or the like. The first link 152 is oscillatingly attached to the movable platen 120 by a pin or the like. The second link 153 is oscillatingly attached to the toggle support 130 by a pin or the like. The second link 153 is attached to the crosshead 151 via a third link 154. In a case where the crosshead 151 is caused to advance and retreat with respect to the toggle support 130, the first and second links 152 and 153 are bent and stretched, and the movable platen 120 advances and retreats with respect to the toggle support 130.

The configuration of the toggle mechanism 150 is not limited to the configuration shown in FIGS. 1 and 2. For example, the number of nodes of each link group is five in FIGS. 1 and 2 but may be four. One end portion of the third link 154 may be connected to the node between the first and second links 152 and 153.

The mold clamping motor 160 is attached to the toggle support 130 and operates the toggle mechanism 150. The mold clamping motor 160 causes the crosshead 151 to advance and retreat with respect to the toggle support 130, so that the first and second links 152 and 153 are bent and stretched to cause the movable platen 120 to advance and retreat with respect to the toggle support 130. The mold clamping motor 160 is directly connected to the motion conversion mechanism 170, but may be connected to the motion conversion mechanism 170 via a belt, pulleys, and the like.

The motion conversion mechanism 170 converts a rotary motion of the mold clamping motor 160 into a linear motion of the crosshead 151. The motion conversion mechanism 170 includes a screw shaft and a screw nut that is screwed to the screw shaft. Balls or rollers may be interposed between the screw shaft and the screw nut.

The mold clamping unit 100 performs a mold closing process, a pressurization process, a mold clamping process, a depressurization process, a mold opening process, and the like under the control of the control device 700.

In the mold closing process, the mold clamping motor 160 is driven to cause the crosshead 151 to advance up to a mold closing completion position at a set movement speed, so that the movable platen 120 is caused to advance and causes the movable mold 820 to touch the stationary mold 810. The position and the movement speed of the crosshead 151 are measured using, for example, a mold clamping motor encoder 161 or the like. The mold clamping motor encoder 161 measures rotation of the mold clamping motor 160, and sends a signal indicating a detection result thereof to the control device 700.

A crosshead position detector for measuring the position of the crosshead 151 and a crosshead movement speed detector for measuring the movement speed of the crosshead 151 are not limited to the mold clamping motor encoder 161, and general detectors can be used. Further, a movable platen position detector for measuring the position of the movable platen 120 and a movable platen movement speed detector for measuring the movement speed of the movable platen 120 are not limited to the mold clamping motor encoder 161, and general detectors can be used.

In the pressurization process, the mold clamping motor 160 is further driven to further cause the crosshead 151 to advance from the mold closing completion position up to a mold clamping position and to generate a mold clamping force.

In the mold clamping process, the mold clamping motor 160 is driven to maintain the position of the crosshead 151 at the mold clamping position. In the mold clamping process, the mold clamping force generated in the pressurization process is maintained. In the mold clamping process, cavity spaces 801 (see FIG. 2) are formed between the movable mold 820 and the stationary mold 810, and the injection unit 300 fills the cavity spaces 801 with liquid molding material. Molding products are obtained in a case where the molding material filling the cavity spaces is solidified.

One cavity space 801 may be provided, or a plurality of cavity spaces 801 may be provided. In the latter case, a plurality of molding products are obtained at the same time. An insert material may be disposed in a part of each cavity space 801, and the other part of each cavity space 801 may be filled with a molding material. Molding products in which the insert material and the molding material are integrated with each other are obtained.

In the depressurization process, the mold clamping motor 160 is driven to cause the crosshead 151 to retreat from the mold clamping position up to a mold opening start position, so that the movable platen 120 is caused to retreat to reduce the mold clamping force. The mold opening start position and the mold closing completion position may be the same position.

In the mold opening process, the mold clamping motor 160 is driven to cause the crosshead 151 to retreat from the mold opening start position up to a mold opening completion position at a set movement speed, so that the movable platen 120 is caused to retreat and causes the movable mold 820 to be separated from the stationary mold 810. After that, the ejector unit 200 ejects the molding products from the movable mold 820.

Set conditions in the mold closing process, the pressurization process, and the mold clamping process are collectively set as a series of set conditions. For example, movement speeds and positions (including a mold closing start position, a movement speed switching position, a mold closing completion position, and a mold clamping position) of the crosshead 151 and mold clamping forces in the mold closing process and the pressurization process are collectively set as a series of set conditions. The mold closing start position, the movement speed switching position, the mold closing completion position, and the mold clamping position are arranged in this order from a rear side toward the front, and indicate starting points and end points of sections in which the movement speeds are set. The movement speed is set for each section. One movement speed switching position may be set, or a plurality of movement speed switching positions may be set. The movement speed switching position may not be set. Only one of the mold clamping position and the mold clamping force may be set.

Set conditions in the depressurization process and the mold opening process are also set in the same manner. For example, movement speeds and positions (including the mold opening start position, the movement speed switching position, and the mold opening completion position) of the crosshead 151 in the depressurization process and the mold opening process are collectively set as a series of set conditions. The mold opening start position, the movement speed switching position, and the mold opening completion position are arranged in this order from a front side toward the rear, and indicate starting points and end points of sections in which the movement speeds are set. The movement speed is set for each section. One movement speed switching position may be set, or a plurality of movement speed switching positions may be set. The movement speed switching position may not be set. The mold opening start position and the mold closing completion position may be the same position. Further, the mold opening completion position and the mold closing start position may be the same position.

The movement speeds, the positions, and the like of the movable platen 120 may be set instead of the movement speeds, the positions, and the like of the crosshead 151. Further, a mold clamping force may be set instead of the position (for example, the mold clamping position) of the crosshead or the position of the movable platen.

The toggle mechanism 150 amplifies the driving force of the mold clamping motor 160 and transmits the amplified driving force to the movable platen 120. The amplification factor of the toggle mechanism 150 is also referred to as a toggle factor. The toggle factor is changed depending on an angle $\theta$ between the first and second links 152 and 153 (hereinafter, also referred to as a "link angle $\theta$"). The link angle $\theta$ is obtained from the position of the crosshead 151. In a case where the link angle $\theta$ is 180°, the toggle factor is at its maximum.

In a case where a thickness of the mold unit 800 is changed due to replacement of the mold unit 800, a change in a temperature of the mold unit 800, or the like, a mold space is adjusted such that a predetermined mold clamping force is obtained during mold clamping. In the adjustment of a mold space, the interval L between the stationary platen 110 and the toggle support 130 is adjusted such that the link angle $\theta$ of the toggle mechanism 150 is a predetermined angle at a time of mold touch when, for example, the movable mold 820 touches the stationary mold 810.

The mold clamping unit 100 includes a mold space adjustment mechanism 180. The mold space adjustment mechanism 180 adjusts the interval L between the stationary platen 110 and the toggle support 130 to adjust a mold space. A timing when a mold space is adjusted is, for example, between the end of a molding cycle and the start of the next molding cycle. The mold space adjustment mechanism 180 includes, for example, screw shafts 181 that are formed at rear end portions of the tie bars 140, screw nuts 182 that are rotatably held by the toggle support 130 not to be capable of advancing and retreating, and a mold space adjustment motor 183 that rotates the screw nuts 182 screwed to the screw shafts 181.

The screw shaft 181 and the screw nut 182 are provided for each tie bar 140. A rotational driving force of the mold space adjustment motor 183 may be transmitted to a plurality of screw nuts 182 via a rotational driving force transmission unit 185. The plurality of screw nuts 182 can be rotated in synchronization. It is also possible to individually rotate the plurality of screw nuts 182 by changing a transmission channel of the rotational driving force transmission unit 185.

The rotational driving force transmission unit 185 includes, for example, gears and the like. In this case, a driven gear is formed on an outer periphery of each screw nut 182, a driving gear is attached to an output shaft of the mold space adjustment motor 183, and an intermediate gear, which meshes with a plurality of driven gears and the driving gear, is rotatably held at a central portion of the toggle support 130. The rotational driving force transmission unit 185 may include a belt, pulleys, and the like instead of the gears.

The operation of the mold space adjustment mechanism 180 is controlled by the control device 700. The control device 700 drives the mold space adjustment motor 183 to rotate the screw nuts 182. As a result, the position of the toggle support 130 with respect to the tie bars 140 is adjusted, so that the interval L between the stationary platen 110 and the toggle support 130 is adjusted. In addition, a plurality of the mold space adjustment mechanisms may be used in combination.

The interval L is measured using a mold space adjustment motor encoder 184. The mold space adjustment motor encoder 184 measures an amount of rotation and a rotation direction of the mold space adjustment motor 183, and sends signals indicating detection results thereof to the control device 700. The detection results of the mold space adjustment motor encoder 184 are used for the monitoring and control of the position of the toggle support 130 and the interval L. A toggle support position detector for measuring the position of the toggle support 130 and an interval detector for measuring the interval L are not limited to the mold space adjustment motor encoder 184, and general detectors can be used.

The mold clamping unit 100 may include a mold temperature controller that adjusts the temperature of the mold unit 800. The mold unit 800 includes a flow channel for a temperature control medium therein. The mold temperature controller adjusts a temperature of a temperature control medium, which is supplied to the flow channel of the mold unit 800, to adjust the temperature of the mold unit 800.

The mold clamping unit 100 of the present embodiment is of a horizontal type in which a mold opening/closing direction is a horizontal direction, but may be of a vertical type in which a mold opening/closing direction is a vertical direction.

The mold clamping unit 100 of the present embodiment includes the mold clamping motor 160 as a drive source, but may include a hydraulic cylinder instead of the mold clamping motor 160. Further, the mold clamping unit 100 may include a linear motor for opening and closing the mold and may include an electromagnet for clamping the mold.

Ejector Unit

In the description of the ejector unit 200, as in the description of the mold clamping unit 100, the moving direction of the movable platen 120 in a case where the mold is to be closed (for example, the X-axis positive direction) will correspond to a front, and the moving direction of the movable platen 120 in a case where the mold is to be opened (for example, the X-axis negative direction) will correspond to a rear.

The ejector unit 200 is attached to the movable platen 120, and advances and retreats together with the movable platen

120. The ejector unit 200 includes ejector rods 210 that eject the molding products from the mold unit 800, and a drive mechanism 220 that moves the ejector rods 210 in the moving direction of the movable platen 120 (X-axis direction).

The ejector rods 210 are disposed in through-holes of the movable platen 120 to be capable of advancing and retreating. Front end portions of the ejector rods 210 are in contact with an ejector plate 826 of the movable mold 820. The front end portions of the ejector rods 210 may be connected to or may not be connected to the ejector plate 826.

The drive mechanism 220 includes, for example, an ejector motor and a motion conversion mechanism that converts a rotary motion of the ejector motor into a linear motion of the ejector rods 210. The motion conversion mechanism includes a screw shaft and a screw nut that is screwed to the screw shaft. Balls or rollers may be interposed between the screw shaft and the screw nut.

The ejector unit 200 performs an ejection process under the control of the control device 700. In the ejection process, the ejector rods 210 are caused to advance up to an ejection position from a standby position at a set movement speed, so that the ejector plate 826 is caused to advance to eject the molding products. After that, the ejector motor is driven to cause the ejector rods 210 to retreat at a set movement speed and to cause the ejector plate 826 to retreat up to the original standby position.

The position and the movement speed of each ejector rod 210 are measured using, for example, an ejector motor encoder. The ejector motor encoder measures rotation of the ejector motor, and sends a signal indicating a detection result thereof to the control device 700. An ejector rod position detector for measuring the position of each ejector rod 210 and an ejector rod movement speed detector for measuring the movement speed of each ejector rod 210 are not limited to the ejector motor encoder, and general detectors can be used.

Injection Unit

In the description of the injection unit 300, unlike in the description of the mold clamping unit 100 and the description of the ejector unit 200, a moving direction of a screw 330 during filling (for example, the X-axis negative direction) will correspond to a front, and a moving direction of the screw 330 during metering (for example, the X-axis positive direction) will correspond to a rear.

The injection unit 300 is installed on a slide base 301, and the slide base 301 is disposed to be capable of advancing and retreating with respect to the injection unit frame 920. The injection unit 300 is disposed to be capable of advancing and retreating with respect to the mold unit 800. The injection unit 300 touches the mold unit 800, and fills the cavity spaces 801 formed in the mold unit 800 with a molding material that is metered in a cylinder 310. The injection unit 300 includes, for example, a cylinder 310 that heats the molding material, a nozzle 320 that is provided at a front end portion of the cylinder 310, the screw 330 that is disposed in the cylinder 310 to be capable of advancing and retreating and to be rotatable, a metering motor 340 that rotates the screw 330, an injection motor 350 that causes the screw 330 to advance and retreat, and a load detector 360 that measures a load transmitted between the injection motor 350 and the screw 330.

The cylinder 310 heats the molding material fed from a feed port 311 to the inside. The molding material includes, for example, a resin and the like. The molding material is formed in the shape of, for example, pellets and is fed to the feed port 311 in a solid state. The feed port 311 is formed at a rear portion of the cylinder 310. A cooler 312, such as a water cooling cylinder, is provided on an outer periphery of the rear portion of the cylinder 310. Heating units 313, such as band heaters, and temperature measurers 314 are provided on the outer periphery of the cylinder 310 in front of the cooler 312.

The cylinder 310 is divided into a plurality of zones in an axial direction of the cylinder 310 (for example, the X-axis direction). The heating unit 313 and the temperature measurer 314 are provided in each of the plurality of zones. A set temperature is set in each of the plurality of zones, and the control device 700 controls the heating units 313 such that temperatures measured by the temperature measurers 314 reach the set temperatures.

The nozzle 320 is provided at the front end portion of the cylinder 310, and is pressed against the mold unit 800. The heating units 313 and the temperature measurers 314 are provided on an outer periphery of the nozzle 320. The control device 700 controls the heating units 313 such that the measured temperature of the nozzle 320 reaches a set temperature.

The screw 330 is disposed in the cylinder 310 to be capable of advancing and retreating and to be rotatable. In a case where the screw 330 is rotated, a molding material is fed forward along a helical groove of the screw 330. The molding material is gradually melted by heat from the cylinder 310 while being fed forward. As the liquid molding material is fed in front of the screw 330 and is accumulated in a front portion of the cylinder 310, the screw 330 is caused to retreat. After that, in a case where the screw 330 is caused to advance, the liquid molding material accumulated in front of the screw 330 is injected from the nozzle 320 and the mold unit 800 is filled with the molding material.

A backflow prevention ring 331 is attached to a front portion of the screw 330 to be capable of advancing and retreating as a backflow prevention valve that prevents backflow of the molding material flowing rearward from the front of the screw 330 in a case where the screw 330 is pushed forward.

In a case where the screw 330 is caused to advance, the backflow prevention ring 331 is pushed rearward by the pressure of the molding material accumulated in front of the screw 330 and retreats relative to the screw 330 up to a closed position (see FIG. 2) where the flow channel for a molding material is closed. Accordingly, the molding material accumulated in front of the screw 330 is prevented from flowing back to the rear.

On the other hand, in a case where the screw 330 is rotated, the backflow prevention ring 331 is pushed forward by the pressure of the molding material fed forward along the helical groove of the screw 330 and advances relative to the screw 330 up to an open position (see FIG. 1) where the flow channel for a molding material is opened. Accordingly, the molding material is fed in front of the screw 330.

The backflow prevention ring 331 may be of either a co-rotation type that is rotated together with the screw 330 or a non-co-rotation type that is not rotated together with the screw 330.

The injection unit 300 may include a drive source that causes the backflow prevention ring 331 to advance and retreat with respect to the screw 330 between the open position and the closed position.

The metering motor 340 rotates the screw 330. A drive source that rotates the screw 330 is not limited to the metering motor 340, and may be, for example, a hydraulic pump or the like.

The injection motor (an example of a drive source) 350 causes the screw 330 to advance and retreat. A motion conversion mechanism that converts a rotary motion of the injection motor 350 into a linear motion of the screw 330, and the like are provided between the injection motor 350 and the screw 330. The motion conversion mechanism includes, for example, a screw shaft and a screw nut that is screwed to the screw shaft. Balls, rollers, or the like may be provided between the screw shaft and the screw nut. A drive source that causes the screw 330 to advance and retreat is not limited to the injection motor 350, and may be, for example, a hydraulic cylinder or the like.

The load detector 360 measures a load that is transmitted between the injection motor 350 and the screw 330. The measured load is converted into a pressure by the control device 700. The load detector 360 is provided in a transmission channel for a load between the injection motor 350 and the screw 330, and measures a load that acts on the load detector 360.

The load detector 360 sends a signal of the measured load to the control device 700. The load measured by the load detector 360 is converted into a pressure that acts between the screw 330 and the molding material, and is used for the control and monitoring of a pressure that is received by the screw 330 from the molding material, a back pressure that acts on the screw 330, a pressure that acts on the molding material from the screw 330, and the like.

A pressure detector that measures the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed in the mold unit 800.

The injection unit 300 performs a metering process, a filling process, a holding pressure process, and the like under the control of the control device 700. The filling process and the holding pressure process may also be collectively referred to as an injection process.

In the metering process, the metering motor 340 is driven to rotate the screw 330 at a set rotating speed to feed the molding material forward along the helical groove of the screw 330. Accordingly, the molding material is gradually melted. As the liquid molding material is fed in front of the screw 330 and is accumulated in a front portion of the cylinder 310, the screw 330 is caused to retreat. A rotating speed of the screw 330 is measured using, for example, a metering motor encoder 341. The metering motor encoder 341 measures rotation of the metering motor 340 and sends a signal indicating a detection result thereof to the control device 700. A screw rotating speed detector that measures the rotating speed of the screw 330 is not limited to the metering motor encoder 341, and a general detector can be used.

In the metering process, the injection motor 350 may be driven to apply a set back pressure to the screw 330 to limit the sudden retreat of the screw 330. The back pressure applied to the screw 330 is measured using, for example, the load detector 360. In a case where the screw 330 retreats up to a metering completion position and a predetermined amount of molding material is accumulated in front of the screw 330, the metering process is completed.

Positions and rotating speeds of the screw 330 in the metering process are collectively set as a series of set conditions. For example, a metering start position, a rotating speed switching position, and a metering completion position are set. These positions are arranged in this order from the front side toward the rear, and indicate starting points and end points of sections in which the rotating speeds are set. The rotating speed is set for each section. One rotating speed switching position may be set, or a plurality of rotating speed switching positions may be set. The rotating speed switching position may not be set. Further, a back pressure is set for each section.

In the filling process, the injection motor 350 is driven to cause the screw 330 to advance at a set movement speed and to fill the cavity spaces 801 formed in the mold unit 800 with the liquid molding material accumulated in front of the screw 330. The position and movement speed of the screw 330 are measured using, for example, an injection motor encoder 351. The injection motor encoder 351 measures rotation of the injection motor 350 and sends a signal indicating a detection result thereof to the control device 700. In a case where the position of the screw 330 reaches a set position, switching of the filling process to the holding pressure process (so-called V/P switching) is performed. A position where V/P switching is performed is also referred to as a V/P switching position. The set movement speed of the screw 330 may be changed depending on the position of the screw 330, a time, or the like.

Positions and movement speeds of the screw 330 in the filling process are collectively set as a series of set conditions. For example, a filling start position (also referred to as an "injection start position"), a movement speed switching position, and a V/P switching position are set. These positions are arranged in this order from the rear side toward the front, and indicate starting points and end points of sections in which the movement speeds are set. The movement speed is set for each section. One movement speed switching position may be set, or a plurality of movement speed switching positions may be set. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, the screw 330 advances at a movement speed lower than the set movement speed so that the pressure of the screw 330 is equal to or lower than the setting pressure for the purpose of protecting the mold.

After the position of the screw 330 reaches the V/P switching position in the filling process, the screw 330 may be caused to temporarily stop at the V/P switching position, and the V/P switching may be then performed. Immediately before the V/P switching, instead of the screw 330 being stopped, the screw 330 may advance at a very low speed or retreat at a very low speed. Further, a screw position detector for measuring the position of the screw 330 and a screw movement speed detector for measuring the movement speed of the screw 330 are not limited to the injection motor encoder 351, and general detectors can be used.

In the holding pressure process, the injection motor 350 is driven to push the screw 330 forward to maintain the pressure of the molding material at a front end portion of the screw 330 (hereinafter, also referred to as a "holding pressure") at a setting pressure and to push a molding material remaining in the cylinder 310 toward the mold unit 800. A shortage of molding material, which is caused by cooling shrinkage in the mold unit 800, can be replenished. The holding pressure is measured using, for example, the load detector 360. A set value of the holding pressure may be changed depending on a time that has passed from the start of the holding pressure process, or the like. A plurality of holding pressures and a plurality of holding times in which the holding pressure is held in the holding pressure process may be set, and may be collectively set as a series of set conditions.

The molding material, with which the cavity spaces 801 formed in the mold unit 800 is filled, is gradually cooled in the holding pressure process, and an inlet of the cavity spaces 801 is closed by the solidified molding material at the time of completion of the holding pressure process. This state is referred to as a gate seal, and the backflow of the molding material from the cavity spaces 801 is prevented. A cooling process is started after the holding pressure process. The molding material in the cavity spaces 801 is solidified in the cooling process. The metering process may be performed in the cooling process for the purpose of shortening a molding cycle time.

The injection unit 300 of the present embodiment is of an in-line screw type, but may be of a pre-plasticizing type or the like. A pre-plasticizing type injection unit feeds a molding material, which is melted in a plasticizing cylinder, to an injection cylinder and injects the molding material into a mold unit from the injection cylinder. A screw is disposed in the plasticizing cylinder to be rotatable and not to be capable of advancing and retreating, or a screw is disposed in the plasticizing cylinder to be rotatable and to be capable of advancing and retreating. Meanwhile, a plunger is disposed in the injection cylinder to be capable of advancing and retreating.

Further, the injection unit 300 of the present embodiment is of a horizontal type in which the axial direction of the cylinder 310 is a horizontal direction, but may be of a vertical type in which the axial direction of the cylinder 310 is a vertical direction. A mold clamping unit to be combined with a vertical type injection unit 300 may be of a vertical type or a horizontal type. Likewise, a mold clamping unit to be combined with a horizontal type injection unit 300 may be of a horizontal type or a vertical type.

Moving Unit

In the description of the moving unit 400, as in the description of the injection unit 300, the moving direction of the screw 330 during filling (for example, the X-axis negative direction) will correspond to a front, and the moving direction of the screw 330 during metering (for example, the X-axis positive direction) will correspond to a rear.

The moving unit 400 causes the injection unit 300 to advance and retreat with respect to the mold unit 800. Further, the moving unit 400 presses the nozzle 320 against the mold unit 800 to generate a nozzle touch pressure. The moving unit 400 includes a hydraulic pump 410, a motor 420 as a drive source, a hydraulic cylinder 430 as a hydraulic actuator, and the like.

The hydraulic pump 410 includes a first port 411 and a second port 412. The hydraulic pump 410 is a pump that can be rotated in both directions, and sucks hydraulic fluid (for example, oil) from any one of the first port 411 and the second port 412 and discharges the hydraulic fluid from the other thereof to generate hydraulic pressure in a case where a rotation direction of the motor 420 is switched. The hydraulic pump 410 can also suck hydraulic fluid from a tank and discharge the hydraulic fluid from any one of the first port 411 and the second port 412.

The motor 420 causes the hydraulic pump 410 to operate. The motor 420 drives the hydraulic pump 410 in a rotation direction, which corresponds to a control signal sent from the control device 700, with rotation torque corresponding to the control signal. The motor 420 may be an electric motor or may be an electric servomotor.

The hydraulic cylinder 430 includes a cylinder body 431, a piston 432, and a piston rod 433. The cylinder body 431 is fixed to the injection unit 300. The piston 432 partitions the inside of the cylinder body 431 into a front chamber 435 as a first chamber and a rear chamber 436 as a second chamber. The piston rod 433 is fixed to the stationary platen 110.

The front chamber 435 of the hydraulic cylinder 430 is connected to the first port 411 of the hydraulic pump 410 via a first flow channel 401. In a case where hydraulic fluid discharged from the first port 411 is supplied to the front chamber 435 via the first flow channel 401, the injection unit 300 is pushed forward. The injection unit 300 advances, so that the nozzle 320 is pressed against the stationary mold 810. The front chamber 435 functions as a pressure chamber that generates the nozzle touch pressure of the nozzle 320 with the pressure of the hydraulic fluid supplied from the hydraulic pump 410.

On the other hand, the rear chamber 436 of the hydraulic cylinder 430 is connected to the second port 412 of the hydraulic pump 410 via a second flow channel 402. In a case where hydraulic fluid discharged from the second port 412 is supplied to the rear chamber 436 of the hydraulic cylinder 430 via the second flow channel 402, the injection unit 300 is pushed rearward. The injection unit 300 retreats, so that the nozzle 320 is separated from the stationary mold 810.

The moving unit 400 includes the hydraulic cylinder 430 in the present embodiment, but the present invention is not limited thereto. For example, an electric motor and a motion conversion mechanism that converts a rotary motion of the electric motor into a linear motion of the injection unit 300 may be used instead of the hydraulic cylinder 430.

Control Device

The control device 700 is formed of, for example, a computer and includes a central processing unit (CPU) 701, a storage medium 702, such as a memory, an input interface 703, an output interface 704, and a communication interface 705 as shown in FIGS. 1 and 2. The control device 700 causes the CPU 701 to execute a program, which is stored in the storage medium 702, to perform various types of control. Further, the control device 700 receives a signal from the outside through the input interface 703, and transmits a signal to the outside through the output interface 704. Furthermore, the control device 700 transmits information to an external device via the communication interface 705.

The control device 700 repeatedly performs the metering process, the mold closing process, the pressurization process, the mold clamping process, the filling process, the holding pressure process, the cooling process, the depressurization process, the mold opening process, the ejection process, and the like to repeatedly produce molding products. A series of operations for obtaining molding products, for example, operations from the start of a metering process to the start of the next metering process, are also referred to as a "shot" or a "molding cycle". Further, a time required for one shot is also referred to as a "molding cycle time" or a "cycle time".

One molding cycle includes, for example, the metering process, the mold closing process, the pressurization process, the mold clamping process, the filling process, the holding pressure process, the cooling process, the depressurization process, the mold opening process, and the ejection process in this order. The order mentioned here is an order in which the respective processes are started. The filling process, the holding pressure process, and the cooling process are performed during the mold clamping process. The start of the mold clamping process may coincide with the start of the filling process. The completion of the depressurization process coincides with the start of the mold opening process.

A plurality of processes may be simultaneously performed for the purpose of shortening a molding cycle time. For example, a metering process may be performed during a cooling process of a previous molding cycle, or may be performed during a mold clamping process. In this case, the mold closing process may be performed at the beginning of the molding cycle. Further, the filling process may be started during the mold closing process. Furthermore, the ejection process may be started during the mold opening process. In a case where an on-off valve for opening and closing a flow channel of the nozzle 320 is provided, the mold opening process may be started during the metering process. The reason for this is that a molding material does not leak from the nozzle 320 as long as the on-off valve closes the flow channel of the nozzle 320 even though the mold opening process is started during the metering process.

One molding cycle may include processes other than the metering process, the mold closing process, the pressurization process, the mold clamping process, the filling process, the holding pressure process, the cooling process, the depressurization process, the mold opening process, and the ejection process.

For example, a pre-metering suck-back process for causing the screw 330 to retreat up to a preset metering start position may be performed before the start of the metering process after the completion of the holding pressure process. Since the pressure of the molding material accumulated in front of the screw 330 can be reduced before the start of the metering process, the sudden retreat of the screw 330 at the time of start of the metering process can be prevented.

Further, a post-metering suck-back process for causing the screw 330 to retreat up to a preset filling start position (also referred to as an "injection start position") may be performed before the start of the filling process after the completion of the metering process. Since the pressure of the molding material accumulated in front of the screw 330 can be reduced before the start of the filling process, leakage of the molding material from the nozzle 320 before the start of the filling process can be prevented.

The control device 700 is connected to an operation unit 750 that receives an input operation performed by a worker and to a display unit 760 that displays a screen. The operation unit 750 and the display unit 760 may be formed of, for example, a touch panel 770 and may be integrated with each other. The touch panel 770 as the display unit 760 displays a screen under the control of the control device 700. For example, information, such as the settings of the injection molding machine 10 and the current state of the injection molding machine 10, may be displayed on the screen of the touch panel 770. The touch panel 770 can receive an operation in the displayed screen region. Further, for example, operation sections, such as buttons or input fields used to receive an input operation performed by a worker, may be displayed in the screen region of the touch panel 770. The touch panel 770 as the operation unit 750 detects an input operation performed on the screen by a worker, and outputs a signal corresponding to the input operation to the control device 700. Accordingly, for example, a worker can operate the operation section provided on the screen to set the injection molding machine 10 (including the input of a set value) while checking information displayed on the screen. Further, a worker can operate the operation section provided on the screen to cause the operation of the injection molding machine 10, which corresponds to the operation section, to be performed. The operation of the injection molding machine 10 may be, for example, the operation (also including stopping) of the mold clamping unit 100, the ejector unit 200, the injection unit 300, the moving unit 400, or the like. Further, the operation of the injection molding machine 10 may be switching of the screen that is displayed on the touch panel 770 as the display unit 760, or the like.

The operation unit 750 and the display unit 760 of the present embodiment have been described as being integrated as the touch panel 770, but may be provided independently of each other. Further, a plurality of operation units 750 may be provided. The operation unit 750 and the display unit 760 are disposed on an operation side (Y-axis negative direction) of the mold clamping unit 100 (more specifically, the stationary platen 110).

ANOTHER EMBODIMENT

Figure 3:
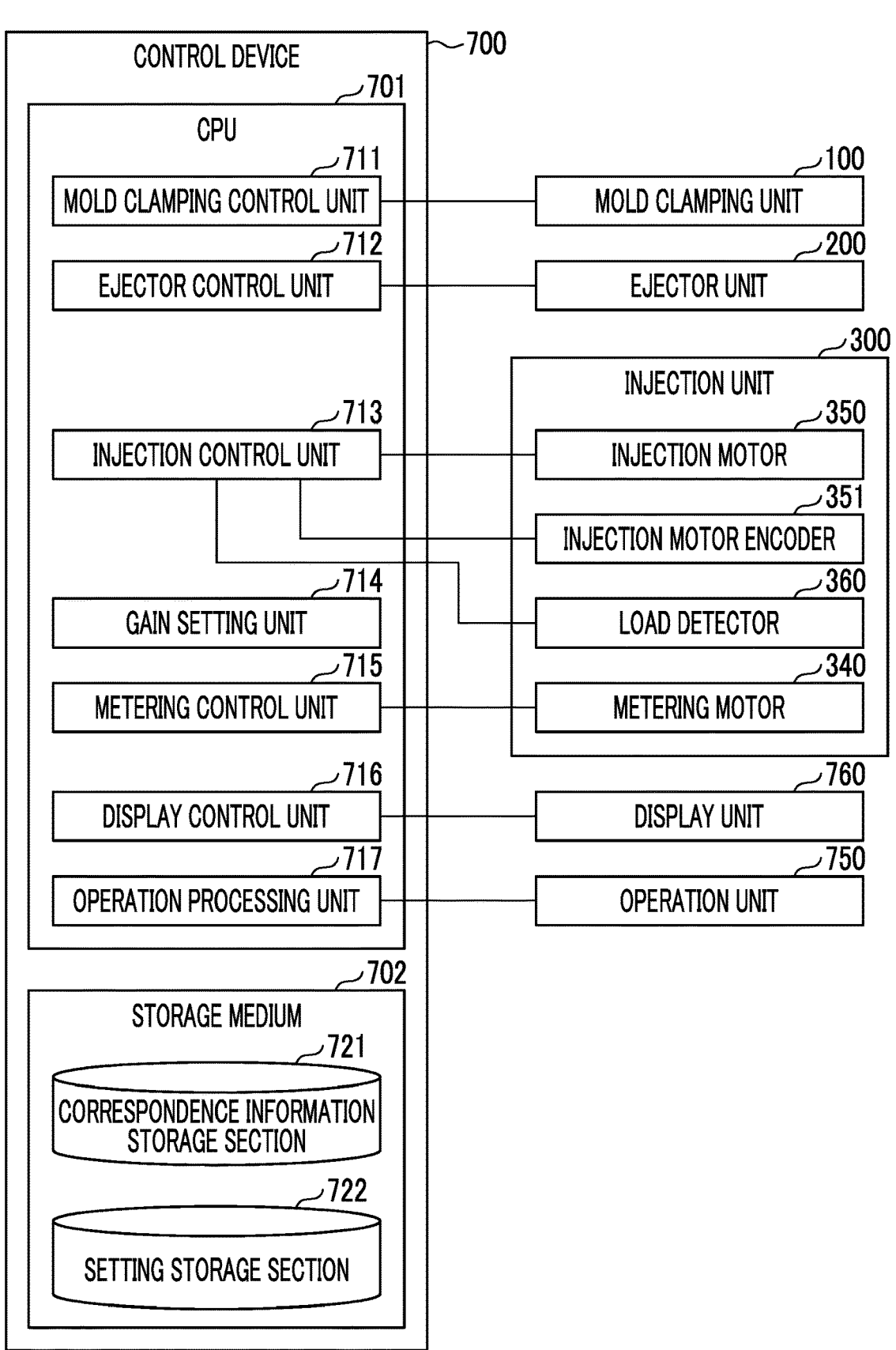
FIG. 3 is a diagram showing components of a control device of an injection molding machine according to another embodiment as functional blocks.

FIG. 3 is a diagram showing components of the control device 700 of the injection molding machine 10 according to the other embodiment as functional blocks. The respective functional blocks shown in FIG. 3 are conceptual and do not necessarily need to be physically configured as shown. All or a part of the respective functional blocks can be functionally or physically distributed and integrated as any unit. All or any part of each processing function performed by each functional block is realized by a program executed by the CPU 701. Alternatively, each functional block may be realized as hardware that uses wired logic.

As shown in FIG. 3, the CPU 701 of the control device 700 includes a mold clamping control unit 711, an ejector control unit 712, an injection control unit 713, a gain setting unit 714, a metering control unit 715, a display control unit 716, and an operation processing unit 717. Further, the storage medium 702 includes a correspondence information storage section 721 and a setting storage section 722.

Figure 4:
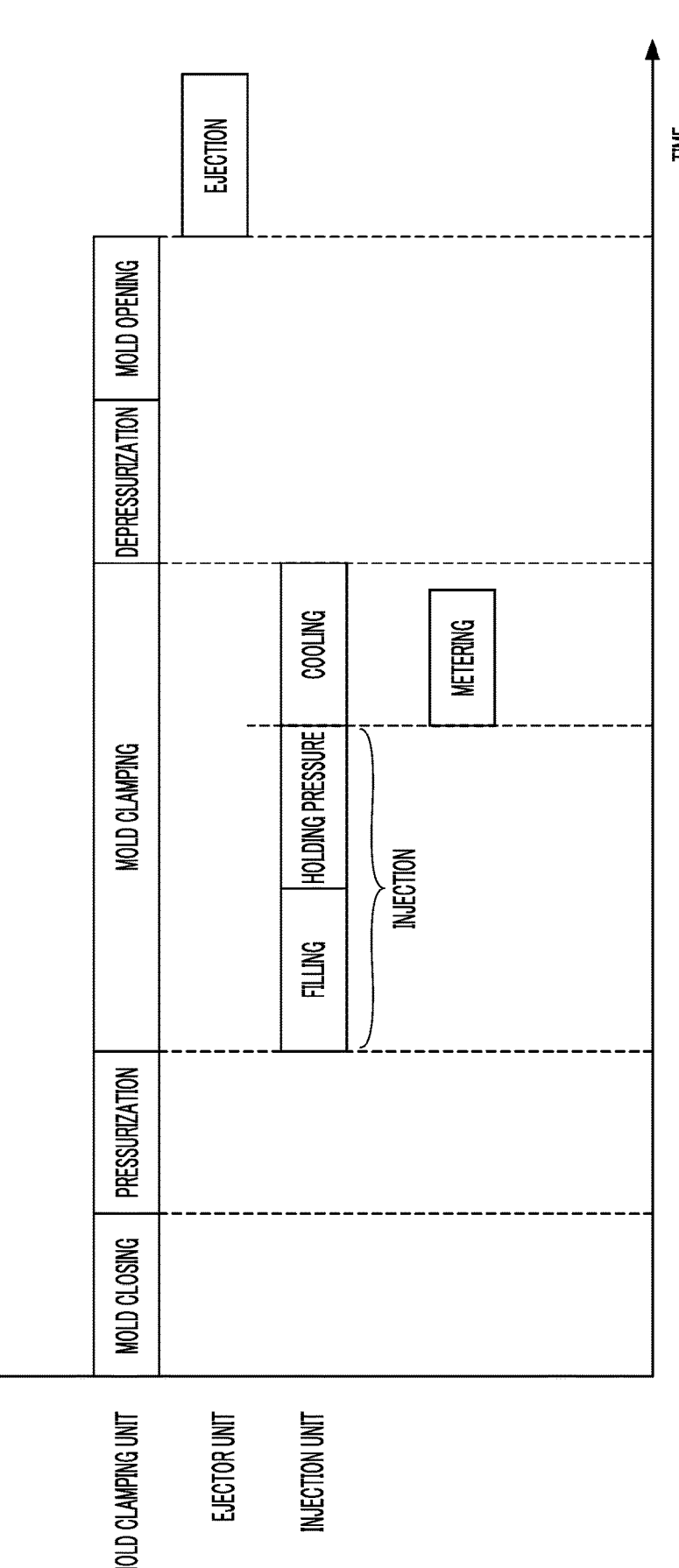
FIG. 4 is a diagram showing an example of processes of a molding cycle.

FIG. 4 is a diagram showing an example of processes of a molding cycle. The control device 700 according to the present embodiment controls each component of the injection molding machine 10 for each process of the molding cycle shown in FIG. 4.

Returning to FIG. 3, the mold clamping control unit 711 controls the mold clamping unit 100 and performs a mold closing process, a pressurization process, a mold clamping process, a depressurization process, and a mold opening process shown in FIG. 4.

The ejector control unit 712 controls the ejector unit 200 and performs an ejection process shown in FIG. 4.

The injection control unit 713 controls an injection drive source of the injection unit 300 and performs an injection process shown in FIG. 4. The injection drive source is, for example, the injection motor 350, but may be a hydraulic cylinder or the like. The injection process includes the filling process and the holding pressure process. The injection process is performed during the mold clamping process.

The metering control unit 715 controls a metering drive source of the injection unit 300 and performs a metering process shown in FIG. 4. The metering drive source is, for example, the metering motor 340, but may be a hydraulic pump or the like. The metering process is performed during the cooling process.

The display control unit 716 controls the display unit 760 to display a screen.

The operation processing unit 717 processes an operation input from a user via the operation unit 750.

The gain setting unit 714 sets a gain that is used for a feedback-control performed in a case where the injection drive source or the metering drive source of the injection unit 300 is controlled.

The gain to be set in the present embodiment is used to reduce a difference between a target value and an actual value, and is a scale factor to be multiplied by a difference between a target value and an actual value or a scale factor to be multiplied by an integrated value of the difference in a case where a PI control is performed as the feedback-control. The gain to be used in the present embodiment is an example, and is not limited to the above-mentioned scale factor to be multiplied. The value of the gain is a value that is used to adjust the degree of convergent change in a case where a control for reducing a difference between a target value and an actual value is performed. That is, the gain to be set may be any value as long as it is a value used to adjust the degree of convergent change during a control for reducing a difference between a target value and an actual value.

The gain to be used for the feedback-control can be set in the present embodiment. Next, the gain will be described.

In a case where the gain is increased in the feedback-control, responsiveness is improved and stability is reduced. As a result, there is a possibility that an actual value of the drive source does not converge on a target value and oscillation occurs. On the other hand, in a case where the gain is reduced in the feedback-control, responsiveness is reduced but stability is improved. As a result, oscillation is suppressed.

In a case where the gain is increased in the feedback-control, the range of the gain in which an actual value of the drive source can converge on a target value depends on properties of a molding material. For example, even if stability substantially identical to stability of a molding material having a high viscosity is ensured in the case of a molding material having a low viscosity, responsiveness can be improved, that is, a high gain can be set. For this reason, it is preferable that a gain is set in the feedback-control such that responsiveness and stability corresponding to the properties of a molding material can be obtained.

Various molding materials are used in the injection molding machine 10 according to the present embodiment in a case where a molding product is molded. For example, a molding material having a low viscosity may be used, or a molding material having a high viscosity may be used. For this reason, it is conceivable that a gain is set depending on the viscosity of a molding material.

For example, it is preferable that a high gain is set to improve responsiveness in a case where the viscosity of a molding material is low and that a low gain is set to reduce responsiveness in a case where the viscosity of a molding material is high.

For this reason, a technique in which a control device automatically adjusts a gain according to detection results of properties of a molding material is considered as in the related art. However, a burden on the control device is increased in the technique in which the control device automatically adjusts a gain.

Meanwhile, a user recognizes the properties of a molding material, that is, the type of a molding material. For this reason, it is considered that the user can set gains corresponding to the properties of the molding material in a case where molding is performed.

Accordingly, a unit used to set a gain is provided to a user in the injection molding machine 10 according to the present embodiment.

In the present embodiment, there are a gain that is used to control the speed of the screw 330 (an example of an injection member) and a gain that is used to control a pressure acting on the molding material from the screw 330, as objects to be set.

In a case where a thin-walled molding product, such as a light guide plate, is molded in the injection molding machine 10, high-speed filling using a molding material having a low viscosity is performed so that the molding material is distributed into all the cavity spaces 801 in the mold unit 800 in a state where the molding material is melted. In such a case, a variation in the minimum cushion position affects the shape of the molding product. The minimum cushion position indicates a position where the screw 330 has advanced most forward (for example, the X-axis negative direction) in the holding pressure process or the filling process. Since the screw 330 advances in the holding pressure process in a case where such a thin-walled molding product is molded, the V/P switching position is substantially the minimum cushion position. On the other hand, since the molding material is pushed using the screw 330 in the holding pressure process in the case of a normal molding product, a position where the holding pressure process is completed is the minimum cushion position.

In a case where high-speed filling is performed, the improvement of responsiveness, which allows an actual speed of the screw 330 to be a target speed, is required to suppress a variation in the minimum cushion position. Accordingly, setting for increasing a gain used to control a speed can be performed in the present embodiment, so that responsiveness in a speed control section of the filling process can be improved. Therefore, the stability of the shape of a thin-walled molding product, such as a light guide plate, can be improved. Next, a configuration used to set a gain will be described.

Setting that can be selected by a user and gains that correspond to the setting are stored in the correspondence information storage section 721 in association with each other. FIG. 5 is a diagram showing a table structure of the correspondence information storage section 721 according to the present embodiment.

As shown in FIG. 5, an item (sensitivity) for which a gain can be adjusted, a setting name that can be selected for the item by a user, a proportional gain that is set in a case where the setting name is selected, and an integral gain that is set in a case where the setting name is selected are stored in the correspondence information storage section 721 in association with each other. The correspondence information storage section 721 shown in FIG. 5 is an example and is not limited to the configuration.

The present embodiment is an example in which a PI control, in which an integral operation is added to a proportional operation, is performed as the feedback-control. For this reason, numerical values of the proportional gains and the integral gains are stored in FIG. 5. However, the present embodiment is not limited to a PI control, and another control, such as a PID control to which a differential operation is further added, may be used. In a case where another control is used, numerical values of gains corresponding to the other control are stored. For example, in a case where a PID control is performed, a differential gain is set in addition to the proportional gain and the integral gain.

In the present embodiment, there are a speed sensitivity, a filling pressure sensitivity, a holding pressure sensitivity, and a back pressure sensitivity as the items. Objects that are adjusted with a speed sensitivity, a filling pressure sensitivity, a holding pressure sensitivity, and a back pressure sensitivity will be described later.

An example in which a user can select one from SHARP, STANDARD, and SOFT for each item (sensitivity) will be described in the present embodiment.

SHARP is a setting in which responsiveness is prioritized, and a proportional gain and an integral gain in SHARP are set to higher values than those in STANDARD and SOFT.

SOFT is a setting in which stability is prioritized, and a proportional gain and an integral gain in SOFT are set to lower values than those in SHARP and STANDARD.

STANDARD is a setting in which both responsiveness and stability are achieved, and a proportional gain and an integral gain in STANDARD are set to lower values than those in SHARP and are set to higher values than those in SOFT.

The setting storage section 722 shown in FIG. 3 stores a molding condition set by a user. FIG. 6 is a diagram showing a table structure of the setting storage section 722 according to the present embodiment.

As shown in FIG. 6, a molding condition name, a product name, a mold name, a molding material name, the setting of a filling pressure sensitivity, the setting of a holding pressure sensitivity, the setting of a back pressure sensitivity, and the setting of a speed sensitivity are stored in the setting storage section 722 in association with each other. An example in which the setting of a filling pressure sensitivity, the setting of a holding pressure sensitivity, the setting of a back pressure sensitivity, and the setting of a speed sensitivity are used as input information input from a user will be described in the present embodiment. However, the present embodiment is not limited to an example in which all of these are set as a sensitivity to be set, and any one or more of these may be set.

The molding condition name is a name (an example of identification information) that identifies a molding condition set by a user. In the present embodiment, a set condition (for example, a molding condition "XX") stored in FIG. 6 can be selected in a case where molding is performed by the injection molding machine 10. In a case where molding is performed under the selected molding condition, the control device 700 performs a feedback-control using a gain that is specified by the setting associated with the molding condition.

The product name is a name (information) set by a user to identify a product that uses the molding condition. The mold name is a name (information) set by a user to identify a mold unit that uses the molding condition. The molding material name is a name set by a user to identify a molding material that uses the molding condition.

An item selected (input) via the operation unit is set for each of the setting of a filling pressure sensitivity, the setting of a holding pressure sensitivity, the setting of a back pressure sensitivity, and the setting of a speed sensitivity. Any one of SHARP, STANDARD, and SOFT is set in an example shown in FIG. 6. Further, the set item is associated with a proportional gain to be used for a proportional operation and an integral gain to be used for an integral operation in the setting storage section 722. Accordingly, gains corresponding to the molding condition can be specified. The present embodiment is an example in which SHARP, STANDARD, or SOFT is set as input information specifying gains as described above. The present embodiment shows an example of input information specifying gains, and any information may be used as long as it is information capable of specifying gains (for example, a character string or a numerical value).

Next, a setting screen will be described. FIG. 7 is a diagram illustrating a setting screen that is displayed by the display control unit 716 according to the present embodiment.

As shown in FIG. 7, the display control unit 716 displays a molding condition name-input field (an example of a second input field) 1701, a product name-input field 1702, a mold name-input field 1703, and a molding material name-input field 1704 on a setting screen 1700 on which a molding condition required for the injection molding machine 10 to perform molding is to be set, as fields to which information for identifying a molding condition can be input.

The molding condition name-input field 1701 is a field to which a molding condition name is to be input as a character string. The product name-input field 1702, the mold name-input field 1703, and the molding material name-input field 1704 are fields to which a product name, a mold name, and a molding material name to which the molding condition indicated by the molding condition name is applied are to be input as character strings. Accordingly, a user can input detailed information that is referred to in a case where the user selects a molding condition used for molding from a plurality of molding conditions.

As shown in FIG. 7, the display control unit 716 displays a filling pressure sensitivity-selection field 1711, a holding pressure sensitivity-selection field 1712, a back pressure sensitivity-selection field 1713, and a speed sensitivity-selection field 1714 on the setting screen 1700 on which a molding condition required for the injection molding machine 10 to perform molding is to be set. The filling pressure sensitivity-selection field 1711, the holding pressure sensitivity-selection field 1712, the back pressure sensitivity-selection field 1713, and the speed sensitivity-selection field 1714 are examples of input fields in which items (examples of input information) for specifying gains to be used for the feedback-control for the molding of the injection molding machine 10 can be selected (input).

The speed sensitivity-selection field 1714 is a field in which an item specifying a gain to be used for the feedback-control for a speed control of the screw 330 is selected. The feedback-control for the speed control of the screw 330 in the filling process will be mainly described in the present embodiment, but a process in which a speed control is performed is not limited to the filling process, and the speed control may be used in the other processes.

The filling pressure sensitivity-selection field 1711, the holding pressure sensitivity-selection field 1712, and the back pressure sensitivity-selection field 1713 are fields in which items specifying gains to be used for a feedback-control to control a pressure acting on the molding material from the screw 330 are selected.

The filling pressure sensitivity-selection field 1711 is a field in which an item specifying a gain to be used for a control based on an upper limit of a pressure, which acts on the molding material from the screw 330 while the speed control of the screw 330 is performed by the injection motor 350 in the filling process, is selected. The control based on the upper limit of the pressure is a control to inhibit the pressure acting on the molding material from the screw 330 from reaching a predetermined upper limit and is, for example, to adjust a timing when the screw 330 is to decelerate, to adjust the deceleration of the screw 330, or the like.

The holding pressure sensitivity-selection field 1712 is a field in which an item specifying a gain used to control the pressure acting on the molding material from the screw 330 performed by the injection motor 350 in the holding pressure process is selected.

The back pressure sensitivity-selection field 1713 is a field in which an item specifying a gain used to control a back pressure acting on the screw 330 performed by the injection motor 350 in the metering process is selected.

Each of the filling pressure sensitivity-selection field 1711, the holding pressure sensitivity-selection field 1712, the back pressure sensitivity-selection field 1713, and the speed sensitivity-selection field 1714 shown in FIG. 7 is a pull-down menu and is a field in which any one of STANDARD, SHARP, and SOFT can be selected. An example in which any one of three types is selected as the selection of gains will be described in the present embodiment. However, items selected as gains are not limited to three types, and may be two types or four or more types.

The operation processing unit 717 receives an input of character string information to the molding condition name-input field 1701, the product name-input field 1702, the mold name-input field 1703, and the molding material name-input field 1704 via the operation unit 750.

Furthermore, the operation processing unit 717 receives a selection (an example of an input) of an item (an example of input information) in each of the filling pressure sensitivity-selection field 1711, the holding pressure sensitivity-selection field 1712, the back pressure sensitivity-selection field 1713, and the speed sensitivity-selection field 1714 via the operation unit 750.

Then, the operation processing unit 717 registers the character string information input to each of the molding condition name-input field 1701, the product name-input field 1702, the mold name-input field 1703, and the molding material name-input field 1704, and the item selected in each of the filling pressure sensitivity-selection field 1711, the holding pressure sensitivity-selection field 1712, the back pressure sensitivity-selection field 1713, and the speed sensitivity-selection field 1714 in the setting storage section 722 such that the character string information and the items are associated with each other.

Accordingly, the control device 700 performs the feedback-control that uses gains corresponding to the set molding condition.

Next, the control of the injection control unit 713 will be described. The injection control unit 713 controls the injection drive source of the injection unit 300 in the filling process and the holding pressure process. The feedback-control using gains corresponding to the set molding condition is also included in the control.

Figure 8:
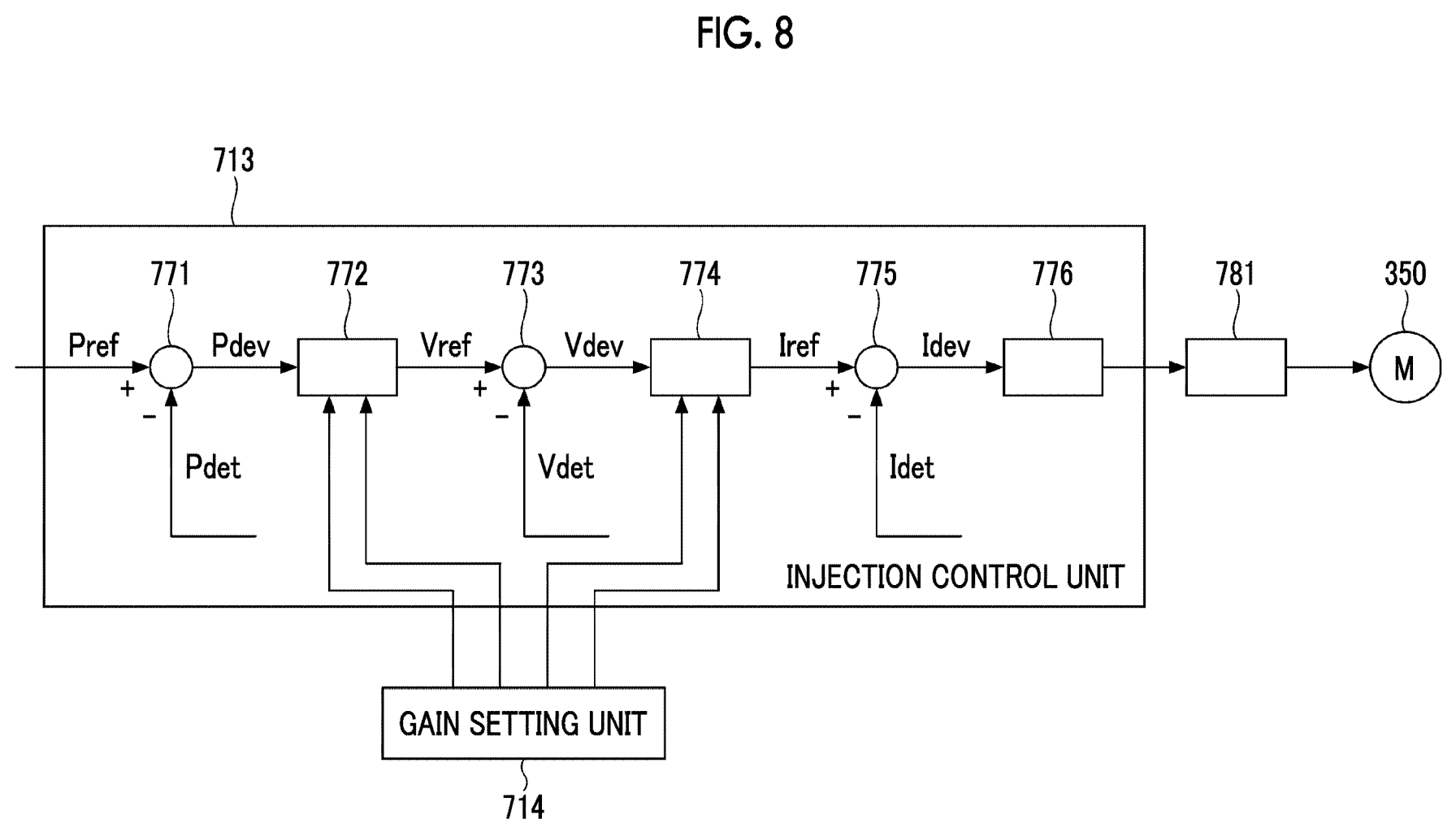

FIG. 8 is a diagram illustrating a configuration of the injection control unit 713 according to the present embodiment. As shown in FIG. 8, the injection control unit 713 includes a first calculation part 771, a speed command generation part 772, a second calculation part 773, a current command generation part 774, a third calculation part 775, and a voltage command generation part 776.

As shown in FIG. 8, the gain setting unit 714 sets gains, which correspond to the currently selected molding condition, for each of the speed command generation part 772 and the current command generation part 774 of the injection control unit 713.

It is assumed that the molding condition is selected in advance by a user in a case where the molding of a product is started. Then, the gain setting unit 714 reads out the gains, which correspond to the molding condition, from the setting storage section 722. The gain setting unit 714 sets gains for each of the speed command generation part 772 and the current command generation part 774 on the basis of the setting of a filling pressure sensitivity and the setting of a speed sensitivity in a case where the filling process is performed.

The first calculation part 771 calculates a difference Pdev (Pdev=Pref−Pdet) between a set pressure value Pref and an actual pressure value Pdet of a resin. The actual pressure value Pdet is acquired by a pressure detector. For example, the load detector 360, the nozzle pressure sensor, or the mold internal pressure sensor is used as the pressure detector as described above.

Meanwhile, the first calculation part 771 may calculate a difference between the set pressure value Pref and the actual pressure value Pdet or may calculate, for example, a ratio between the set pressure value Pref and the actual pressure value Pdet.

The speed command generation part 772 generates a speed command value Vref (an example of a signal) with a feedback-control that uses the difference calculated by the first calculation part 771 (a difference between the set pressure value Pref of a resin used to control an object to be controlled and the actual pressure value Pdet measured from the object to be controlled) and gains specified by items (an example of input information) associated with the molding condition. Specifically, the speed command generation part 772 generates the speed command value Vref of the screw 330 so that the difference Pdev calculated by the first calculation part 771 is reduced (is preferably zero). An example in which a PI control is used for the generation of the speed command value Vref is described in the present embodiment, but a PID control may be used.

Figure 9:
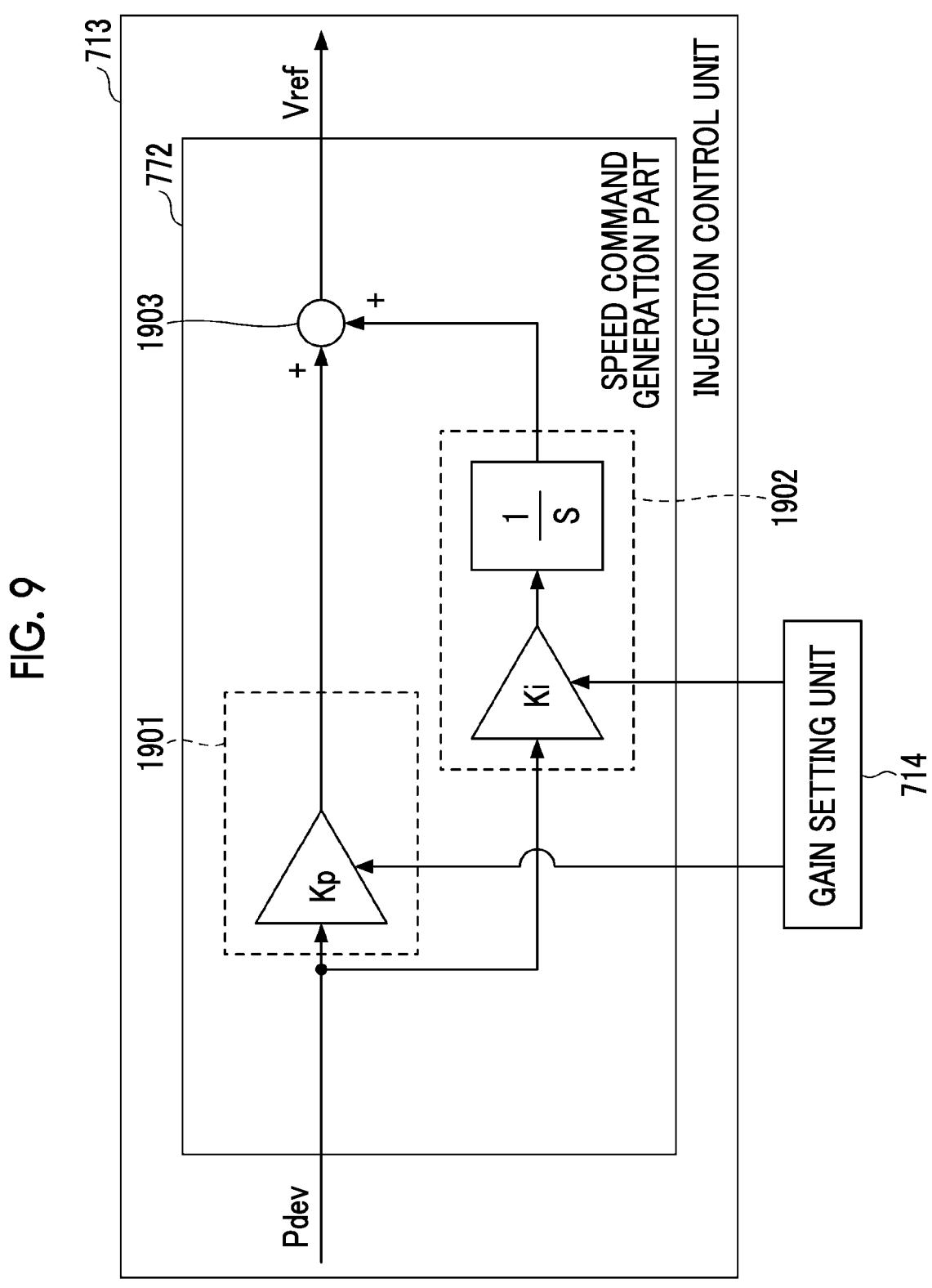
FIG. 9 is a diagram illustrating a configuration of a speed command generation part according to the other embodiment.

FIG. 9 is a diagram illustrating a configuration of the speed command generation part 772 according to the present embodiment. As shown in FIG. 9, the speed command generation part 772 includes a proportional compensator 1901, an integral compensator 1902, and an adder 1903.

The proportional compensator 1901 is used to output an amount, which dynamically follows a target value, on the basis of the difference Pdev. A proportional gain Kp used in the proportional compensator 1901 is set by the gain setting unit 714.

The integral compensator 1902 is mainly used to reduce a steady-state deviation by increasing a gain in a low frequency range. An integral gain Ki used in the integral compensator 1902 is set by the gain setting unit 714. Meanwhile, "1/s" represents an integral.

The adder 1903 outputs a result that is obtained in a case where an output of the proportional compensator 1901 and an output of the integral compensator 1902 are added to each other.

The speed command generation part 772 has the above-mentioned configuration and generates the speed command value Vref.

Returning to FIG. 8, the second calculation part 773 calculates a difference Vdev (Vdev=Vref−Vdet) between the speed command value Vref (an example of set information) and an actual speed value Vdet. The actual speed value Vdet is acquired by a speed detector. For example, the injection motor encoder 351 is used as the speed detector as described above.

Meanwhile, the second calculation part 773 may calculate a difference between the speed command value Vref and the actual speed value Vdet or may calculate, for example, a ratio between the speed command value Vref and the actual speed value Vdet.

The current command generation part 774 generates a current command value Iref (an example of a signal) with a feedback-control that uses the difference calculated by the second calculation part 773 (a difference between the speed command value Vref used to control the object to be controlled and the actual speed value Vdet measured from the object to be controlled) and gains specified by items (an example of input information) associated with the molding condition. Specifically, the current command generation part 774 generates the current command value Iref of the injection motor 350 so that the difference Vdev calculated by the second calculation part 773 is reduced (is preferably zero). An example in which a PI control is used for the generation of the current command value Iref is described in the present embodiment, but a PID control may be used.

In a case where the current command generation part 774 performs a PI control, it is assumed that, for example, the current command generation part 774 has the same configuration as the speed command generation part 772 shown in FIG. 9. In this case, a proportional gain Kp and an integral gain Ki in the current command generation part 774 are set by the gain setting unit 714.

The third calculation part 775 calculates a difference Idev (Idev=Iref−Idet) between the current command value Iref and an actual current value Idet. The actual current value Idet is acquired by a current detector. The current detector is attached to, for example, an inverter 781 or the injection motor 350.

Meanwhile, the third calculation part 775 may calculate a difference between the current command value Iref and the actual current value Idet or may calculate, for example, a ratio between the current command value Iref and the actual current value Idet.

The voltage command generation part 776 generates a voltage command value so that the difference Idev calculated by the third calculation part 775 is reduced (is preferably zero).

The inverter 781 supplies an alternating current to the injection motor 350 according to the voltage command value that is generated by the voltage command generation part 776.

The configuration of the injection control unit 713 is an example, and the injection control unit 713 may include components not shown in FIG. 8. For example, the injection control unit 713 may include a torque command generation part (not shown) instead of the current command generation part 774. The reason for this is that the torque of the injection motor 350 is substantially proportional to the current of the injection motor 350.

The torque command generation part generates a torque command value Tref of the injection motor 350 so that the difference Vdev calculated by the second calculation part 773 is reduced (is preferably zero). The third calculation part 775 calculates a difference Tdev (Tdev=Tref−Tdet) between the torque command value Tref and an actual torque value Tdet. The voltage command generation part 776 generates a voltage command value so that the difference Tdev calculated by the third calculation part 775 is reduced (is preferably zero).

The injection control unit 713 according to the present embodiment can control the injection motor (an example of a drive source) 350 in the injection process with the above-mentioned configuration.

Further, gains to be set for each of the speed command generation part 772 and the current command generation part 774 by the gain setting unit 714 depend on a difference in the filling process or the holding pressure process of the injection process.

That is, in the case of the filling process, the gain setting unit 714 sets numerical values of gains, which correspond to the current molding condition and correspond to the setting of a speed sensitivity, for the speed command generation part 772 and sets numerical values of gains, which correspond to the current molding condition and correspond to the setting of a filling pressure sensitivity, for the current command generation part 774. That is, in a case where any one of "SHARP", "STANDARD", and "SOFT" is set for each of the setting of a speed sensitivity and the setting of a filling pressure sensitivity, the gain setting unit 714 reads out a proportional gain and an integral gain corresponding to the setting from the correspondence information storage section 721 and sets the proportional gain and the integral gain, which are read out, for each of the speed command generation part 772 and the current command generation part 774.

Further, in the case of the holding pressure process, the gain setting unit 714 sets numerical values of gains, which correspond to the current molding condition and correspond to the setting of a holding pressure sensitivity, for the current command generation part 774. In the case of the holding pressure process, the gain setting unit 714 may set numerical values of gains, which are predetermined for the holding pressure process, or may set numerical values of gains, which correspond to the molding condition, for the speed command generation part 772.

Furthermore, in the present embodiment, a control is performed by the injection control unit 713 even in a process other than the injection process. For example, in the metering process in which the screw 330 is rotated to move the molding material, the injection motor 350 is driven to apply a set back pressure to the screw 330 so that the sudden retreat of the screw 330 is limited. At that time, the injection control unit 713 performs a control to drive the injection motor 350.

Further, in the case of the metering process, the gain setting unit 714 sets numerical values of gains, which correspond to the current molding condition and correspond to the setting of a back pressure sensitivity, for the current command generation part 774. In the case of the metering process, the gain setting unit 714 may set numerical values of gains, which are predetermined for the metering process, or may set numerical values of gains, which correspond to the molding condition, for the speed command generation part 772.

An example in which one is selected from SHARP, STANDARD, and SOFT as an item for specifying gains has been described in the present embodiment. However, the present embodiment does not limit items for specifying gains, and the input of numerical values of gains may be directly received from a user as input information for specifying gains.

In the present embodiment, an item set by a user for each of a filling pressure sensitivity, a holding pressure sensitivity, a back pressure sensitivity, and a speed sensitivity is stored for each molding condition. For this reason, in a case where a user is to switch a molding product and the like to be molded in the injection molding machine 10, the user can switch a plurality of numerical values of gains to be used for the feedback-control by only selecting a molding condition. Accordingly, an operational burden on the user can be reduced.

In the control device 700 according to the present embodiment, gains corresponding to a molding condition required for molding to be performed can be set. The set gains can be stored in the setting storage section 722 as a molding condition.

That is, in the present embodiment, gains corresponding to the viscosity of a molding material can be set, and the setting of the gains can be stored as a molding condition. In the present embodiment, gains can be set for a molding condition that is determined by a combination of a product, a molding material, and a mold. That is, a user can call up a molding condition to be used for the injection molding machine 10 to set gains appropriate for the molding of the product. Accordingly, since gains appropriate for the product can be set, the molding accuracy of the product can be improved.

In addition, since appropriate gains are set without calculation as compared to a method of automatically setting gains according to the properties of a molding material, a control burden can be reduced.

A gain to be used in a case where the speed of the screw 330 is controlled in the filling process can be changed in the present embodiment. Accordingly, in a case where, for example, a resin having a low viscosity (for example, polypropylene or the like) is used as a molding material, a high gain can be set as compared to a case where a resin having a high viscosity is used. Further, a high gain can be set even in a case where a molding product requiring a highly responsive control (for example, a light guide plate or a thin-walled molding product, such as a container) is to be molded. Accordingly, the responsiveness of an actual speed with respect to a target speed can be improved in the speed control of the screw 330 in the filling process.

Since the minimum cushion position affects the shape of a product in a case where a molding product is molded, it is important to stabilize the minimum cushion position. In a case where the injection molding machine 10 molds a thin-walled product, the screw 330 reaches the minimum cushion position while a speed control in the filling process is performed. For this reason, in a case where a thin-walled product is to be molded, the adjustment of a gain to be used for a speed control is effective in stabilizing the minimum cushion position. Accordingly, since an item can be selected for a speed sensitivity in the present embodiment, a gain to be used for a speed control can be adjusted. As a result, the stability of the shape of a product can be improved.

However, the final shape of a normal molding product is often determined by a pressure control in the holding pressure process. For this reason, in a case where a normal molding product is molded, the adjustment of a gain to be used for a pressure control in the holding pressure process is effective in stabilizing a shape. Accordingly, since an item can be selected for a holding pressure sensitivity in the present embodiment, a gain to be used for a pressure control can be adjusted. As a result, the stability of the shape of a product can be improved.

First Modification Example

A case where the drive source is the injection motor 350 and the injection control unit 713 performs a control to drive the injection motor 350 has been described in the above-mentioned embodiment. However, the above-mentioned embodiment does not limit the drive source to the injection motor 350. Accordingly, a case where the drive source is a mold clamping motor 160 will be described in a first modification example.

Further, a feedback-control is performed in a case where a mold clamping control unit 711 according to the present modification example controls the mold clamping motor 160.

For example, cavity spaces 801 are formed between the movable mold 820 and the stationary mold 810 during mold clamping, and are filled with a molding material. The movable mold 820 is pushed back by the pressure of the molding material. For this reason, as the properties of the molding material are changed with time during the injection process, disturbance applied to an object to be controlled by the mold clamping control unit 711 may be changed with time.

Accordingly, as in the above-mentioned embodiment, the gain setting unit 714 sets gains, which correspond to a molding condition, for the mold clamping control unit 711 for the feedback-control.

In the present modification example, a selection of items for specifying gains may be received from a user on the setting screen as in the above-mentioned embodiment. The user can select items in consideration of the type of the molding material, that is, the properties of the molding material.

Gains corresponding to the items selected by the user are stored in the setting storage section 722 in association with the molding condition. Accordingly, the gain setting unit 714 can set gains, which correspond to the properties of the molding material, for the mold clamping control unit 711. The feedback-control is a PI control, a PID control, or the like as in the above-mentioned embodiment, and the gains to be set are also a proportional gain, an integral gain, and the like as in the above-mentioned embodiment.

Since the gains corresponding to the properties of the molding material are set for the mold clamping control unit 711, disturbance applied to the object to be controlled can be estimated, and a feedback-control can be performed on an input to the object to be controlled. Accordingly, an influence of the disturbance can be reduced in a case where the disturbance occurs.

Second Modification Example

A case where the drive source is the mold clamping motor 160 and the mold clamping control unit 711 performs a control to drive the mold clamping motor 160 has been described in the above-mentioned modification example. However, the above-mentioned modification example does not limit the drive source to the mold clamping motor 160. Accordingly, a case where the drive source is an ejector motor will be described in a second modification example.

Further, a feedback-control is performed in a case where an ejector control unit 712 according to the present modification example controls the ejector motor.

For example, the ejector unit 200 is controlled during mold clamping and can compress the molding material with which the cavity spaces 801 are filled. The compression of the molding material is performed before the complete solidification of the molding material, and is performed during the injection process. In this case, the ejector plate 826 is pushed back by the pressure of the molding material. For this reason, as the properties of the molding material are changed with time during the injection process, disturbance applied to an object to be controlled by the ejector control unit 712 may be changed with time.

Accordingly, in the present modification example, the gain setting unit 714 sets gains, which correspond to a molding condition, for the ejector control unit 712 for the feedback-control.

In the present modification example, a selection of items for specifying gains may be received from a user on the setting screen as in the above-mentioned embodiment. The user can select items in consideration of the type of the molding material, that is, the properties of the molding material.

Gains corresponding to the items selected by the user are stored in the setting storage section 722 in association with the molding condition. Accordingly, the gain setting unit 714 can set gains, which correspond to the properties of the molding material, for the ejector control unit 712. The feedback-control is a PI control, a PID control, or the like as in the above-mentioned embodiment, and the gains to be set are also a proportional gain, an integral gain, and the like as in the above-mentioned embodiment.

Since the gains corresponding to the properties of the molding material are set for the ejector control unit 712, disturbance applied to the object to be controlled can be estimated, and a feedback-control can be performed on an input to the object to be controlled. Accordingly, an influence of the disturbance can be reduced in a case where the disturbance occurs.

Third Modification Example

A case where the drive source is the metering motor 340 will be described in a third modification example.

Further, a feedback-control is performed in a case where a metering control unit 715 according to the present modification example controls the metering motor 340.

For example, the metering control unit 715 controls the metering motor 340 in the metering process to rotate the screw 330, so that resin pellets are fed forward along the helical groove of the screw 330. The resin pellets are gradually melted by heat from the cylinder 310 while being fed forward. Since new resin pellets are fed into the cylinder 310 in the metering process, the temperature distribution of the resin in the cylinder 310 is changed with time. For this reason, as the properties of the molding material may be changed with time during the metering process, disturbance applied to an object to be controlled by the metering control unit 715 may be changed with time. Accordingly, a feedback-control is performed in a case where the metering control unit 715 controls the metering motor 340.

Therefore, as in the above-mentioned embodiment, the gain setting unit 714 sets gains, which correspond to a molding condition, for the metering control unit 715 for the feedback-control.

In the present modification example, a selection of items for specifying gains may be received from a user on the setting screen as in the above-mentioned embodiment. The user can select items in consideration of the type of the molding material, that is, the properties of the molding material.

Gains corresponding to the items selected by the user are stored in the setting storage section 722 in association with the molding condition. Accordingly, the gain setting unit 714 can set gains, which correspond to the properties of the molding material, for the metering control unit 715. The feedback-control is a PI control, a PID control, or the like as in the above-mentioned embodiment, and the gains to be set are also a proportional gain, an integral gain, and the like as in the above-mentioned embodiment.

Since the gains corresponding to the properties of the molding material are set for the metering control unit 715, disturbance applied to the object to be controlled can be estimated, and a feedback-control can be performed on an input to the object to be controlled. Accordingly, an influence of the disturbance can be reduced in a case where the disturbance occurs.

Fourth Modification Example

An example in which numerical values of all gains to be used for a feedback-control are set according to a user's selection has been described in the above-mentioned embodiment. However, the above-mentioned embodiment is not limited to the example in which a user sets all the gains. For example, in the filling process, a feedback-control using gains based on an item set by a user may be performed for the speed control of the screw 330, and a feedback-control using gains calculated by the control device 700 may be performed for a control that inhibits the pressure acting on the molding material from the screw 330 from reaching a predetermined upper limit. In other words, a gain of a speed sensitivity may be selected by a user and a gain of a filling pressure sensitivity may be automatically adjusted. As described above, a user's selection and automatic adjustment may be combined with regard to the adjustment of the sensitivities. Any well-known method may be used for the automatic adjustment.

In addition, a user's selection and automatic specifying may be combined with regard to the adjustment of one gain. That is, a user selects items related to gains in the sensitivity-selection fields. After that, the control device 700 may automatically adjust the gains during the feedback-control using the numerical values of the gains, which correspond to the selected items, as start values.

Examples in which the set pressure value Pref and the speed command value Vref are used as set values used to control an object to be controlled have been described in the above-mentioned embodiment and the modification examples. The set values used to control the object to be controlled are values that are set in the machine to control the object to be controlled, and may be used as target values in a case where actual values are to be controlled. Examples of set values used to control the object to be controlled are shown in the present embodiment, and are not limited to the set pressure value Pref and the speed command value Vref described above. Other examples of the set values may include settings that are input by a user to control the object to be controlled, settings that are calculated by the control device on the basis of set information input by a user, or settings that are autonomously determined by the control device on the basis of the quality of a molding product desired by a user. Any well-known method may be used as a method of calculating settings using the control device and a method of autonomously determining settings using the control device.

Operation

Since gains to be used for a feedback-control of the drive source can be set in the injection molding machines and the display units of the injection molding machines according to the embodiment and the modification examples described above, the control of the drive source corresponding to the properties of a molding material, and the like can be performed. As a result, the stability of the quality of a molding product can be improved.

Further, since a user sets gains corresponding to the properties of the molding material in the injection molding machines and the display units of the injection molding machines according to the embodiment and the modification examples described above, an increase in a processing burden on the control device 700 can be suppressed.

An aspect of the present invention provides a technique that improves the quality of a molding product and that suppresses an increase in a processing burden for the adjustment of gains by allowing gains corresponding to the molding product to be settable.

The injection molding machine and the display unit of the injection molding machine according to the embodiments of the present invention have been described above, but the present invention is not limited to the above-mentioned embodiment and the like. Various modifications, corrections, substitutions, additions, deletions, and combinations can be made within the scope of the appended claims. Naturally, those also belong to the technical scope of the present invention.

It should be understood that the invention is not limited to the above-described embodiment, but may be modified into various forms on the basis of the spirit of the invention. Additionally, the modifications are included in the scope of the invention.

What is claimed is:

1. An injection molding machine comprising:
one or more processors; and
a non-transitory storage medium storing instructions thereon, the instructions when executed by the one or more processors cause the one or more processors to:
receive input information for specifying a gain from a user, a molding condition under which molding is performed using the gain, and identification information for identifying the molding condition;
store the input information, the molding condition, and the identification information in association with each other; and
in response to a selection of the identification information, generate a signal with a feedback-control, which uses a difference between a set value used to control an object to be controlled and an actual value measured from the object to be controlled and the gain specified by the input information associated with the molding condition and the identification information, and control a drive source using the signal to perform the molding when performing the molding indicated by the molding condition.

2. The injection molding machine according to claim 1, wherein the drive source moves an injection member that pushes a molding material,
the input information is information that specifies the gain used to control a speed of the injection member, and
the one or more processors are configured to generate the signal with the feedback-control, which uses the difference and the gain, and to control the speed of the injection member using the signal.

3. The injection molding machine according to claim 1, wherein the drive source moves an injection member that pushes a molding material,
the input information is information that specifies the gain used to control a pressure acting on the molding material from the injection member, and
the one or more processors are configured to generate the signal with the feedback-control, which uses the difference and the gain, and control the pressure acting on the molding material from the injection member using the signal.

4. The injection molding machine according to claim 3, wherein the control of the pressure is at least one or more of a control based on an upper limit of the pressure acting on the molding material from the injection member in a filling process for controlling a speed of the injection member, a control in a holding pressure process for controlling the pressure acting on the molding material from the injection member, and a control of a back pressure acting on the injection member in a metering process for rotating the injection member to move the molding material.

5. The injection molding machine according to claim 1, wherein the feedback-control is a PI control in which an integral operation is added to at least a proportional operation, and the input information is information that specifies the gain for each of the proportional operation and the integral operation.

\* \* \* \* \*